United States Patent [19]

Onarheim et al.

[11] Patent Number: 5,168,441

[45] Date of Patent: Dec. 1, 1992

[54] METHODS FOR SET UP AND PROGRAMMING OF MACHINE AND PROCESS CONTROLLERS

[75] Inventors: William G. Onarheim, Milwaukee; Horace Dudley, Hales Corners; Barbara E. Meyer, Greendale; Michael J. Viste, Grafton, all of Wis.; David J. Morley, Thousand Oaks, Calif.

[73] Assignee: Allen-Bradley Company, Inc., Milwaukee, Wis.

[21] Appl. No.: 531,261

[22] Filed: May 30, 1990

[51] Int. Cl.$^5$ .................. G06F 15/46; G06F 15/60
[52] U.S. Cl. .................. 364/146; 364/188; 364/192; 395/500
[58] Field of Search .................. 364/130–194, 364/200 MS File, 900 MS File; 395/100–161

[56] References Cited

U.S. PATENT DOCUMENTS

| Re. 32,632 | 3/1988 | Atkinson | 340/709 |
|---|---|---|---|
| 4,315,315 | 2/1982 | Kossiakoff | 364/200 |
| 4,570,217 | 2/1986 | Allen et al. | 364/188 |
| 4,663,704 | 5/1987 | Jones et al. | 364/146 X |
| 4,736,340 | 4/1988 | Desserrieres et al. | 364/DIG. 2 |
| 4,742,443 | 5/1988 | Rohn et al. | 364/136 |
| 4,827,404 | 5/1989 | Barstow et al. | 364/188 X |

(List continued on next page.)

FOREIGN PATENT DOCUMENTS

| 0184422 | 6/1986 | European Pat. Off. |
| 4013960 | 11/1990 | Fed. Rep. of Germany |
| 2233128 | 1/1991 | United Kingdom |

OTHER PUBLICATIONS

Ambler and Burnett, "Influence of Visual Technology on the Evolution of Language Environments", *Computer*, IEEE Oct., 1989, pp. 9–22.

Kramer, Magee & Ng, "Graphical Configuration Programming", *Computer*, IEEE Oct., 1989, pp. 53–65.

Smalltalk V/286 Tutorial and Programming Handbook, Digitalk Inc., 1988, pp. 1–3.

Miller, R., "Savior: The Object Is Cell Control", *Managing Automation*, Apr. 1988, pp. 66–70.

Flexis TM ToolSet TM Brochure, Savoir Systems Group, Oakland, Calif., Oct., 1987.

Flexis TM Product Overview, Savoir Systems Group, Oakland, Calif., Apr., 1988.

Draft of Approved French Standard, Sep. 1981.

International Electrotechnical Commission—Preparation of Function Charts for Control Systems, Jan. 1982.

International Electrotechnical Commission—Standard for Programmable Controllers—Part 3: Programming Languages, Nov. 1984.

"Programmable Controller Functions Are Enhanced by Structural Programming", Control Engineering, Feb. 1984.

(List continued on next page.)

*Primary Examiner*—Joseph Ruggiero
*Attorney, Agent, or Firm*—Quarles & Brady

[57] ABSTRACT

Graphical editing methods are employed to construct programs in high-level graphical languages prior to compilation and operation in controllers for industrial or commercial equipment. The editing methods include process, hardware and program editing tasks for defining both process and hardware I/O points and connecting them to variables in a controller program. Each editing task has a tree graph window, a graph editing window, and a palette with rotating panels of graphical editing tools. The hardware editing taks uses two-layered icons to graphically simulate the hardware environment. A plurality of graph types are based on generalized node-vert-arc graphical elements which are special classes programmed in the Smalltalk programming language. Languages for the controller program include function block, sequential function chart and ladder diagram.

19 Claims, 44 Drawing Sheets

Microfiche Appendix Included
(343 Microfiche, 4 Pages)

U.S. PATENT DOCUMENTS

| | | | |
|---|---|---|---|
| 4,870,561 | 9/1989 | Love et al. | 364/192 |
| 4,885,694 | 12/1989 | Pray et al. | 395/156 X |
| 4,901,221 | 2/1990 | Kodosky et al. | 364/200 |
| 4,939,507 | 7/1990 | Beard et al. | 364/900 |
| 5,005,119 | 4/1991 | Rumbaugh et al. | 364/191 X |
| 5,021,976 | 6/1991 | Wexelblat et al. | 364/146 X |
| 5,079,723 | 1/1992 | Herceg et al. | 395/156 |

OTHER PUBLICATIONS

"A Program Development Tool for the Entire Automation Staff", published by Siemens, date unknown.

"Controller Combines Computer and Programmable Control Functions", Control Engineering, Nov. 1984.

"Data PCs From Maxitron—Conceptual and Technical Perspectives" brochure published in 1985.

P. Liu, et al., "A Layered Intelligence Architecture for Programmable Controller Configurations", ESD/SMI Expert Systems, Proceedings, Dearborn, Mich., Jun. 9-11, 1987.

D. Ingalls, et al., "Fabrik, A Visual Programming Environment" OOPSLA '88 Proceedings, Sep. 25-30, 1988.

| 7 TAGS | TAG_TYPE | LOCATION |
|---|---|---|
| CAR_DETECT_1.CAR_DET | (IN DISCRETE 120AC) | ENTRY |
| CONVEYER.AUX_CONTAC | (IN DISCRETE 120AC) | ENTRY |
| CONVEYER.OVER_TEMP | (IN DISCRETE 120AC) | ENTRY |
| CONVEYER.CONV_MOTOR | (OUT DISCRETE 120AC) | ENTRY |
| CAR_PULL.CONV_SPEED_ | (IN ANALOG 10DC) | ENTRY |
| CAR_PULL.CAR_LENGTH | (OUT ANALOG 10DC) | ENTRY |
| CAR_LENGTH.LENGTH | (IN ANALOG 10DC) | ENTRY |

FIG. 16

| 8 TAGS | TAG_TYPE | LOCATION |
|---|---|---|
| CAR_DETECT_2.CAR_DET | (IN DISCRETE 120AC) | ENTRY |
| LEVEL.SOAP_WATER_LEV | (IN DISCRETE 120AC) | ENTRY |
| SOAP_WATER.SOAP_WAT | (IN DISCRETE 120AC) | ENTRY |
| SPRAY_PUMP.AUX_CONT. | (IN DISCRETE 120AC) | ENTRY |
| SPRAY_PUMP.OVER_TEM | (IN DISCRETE 120AC) | ENTRY |
| SPRAY_PUMP.WATER_PU | (OUT DISCRETE 120AC) | ENTRY |
| WATER.VALVE_OPEN | (IN DISCRETE 120AC) | ENTRY |
| WATER.WATER_VALVE | (OUT DISCRETE 120AC) | ENTRY |

NAME(WASH.)

FIG. 17

| 8 TAGS | TAG_TYPE | LOCATION | |
|---|---|---|---|
| CAR_DETECT_3.CAR_DET | (IN DISCRETE 120AC) | EXIT | |
| WAX_1.WAX_1_OPEN | (IN DISCRETE 120AC) | EXIT | |
| WAX_1.WAX_1_VALVE | (OUT DISCRETE 120AC) | EXIT | |
| WAX_2.WAX_2_OPEN | (IN DISCRETE 120AC) | EXIT | |
| M_1.AUX_CONTACT | (IN DISCRETE 120AC) | EXIT | |
| M_1.OVER_TEMP | (IN DISCRETE 120AC) | EXIT | |
| M_1.WAX_SPRAY_PUMP | (OUT DISCRETE 120AC) | EXIT | |
| WAX_SPRAY.WAX_FLOW | (IN DISCRETE 120AC) | EXIT | |

FIG. 18

| 7 TAGS | TAG_TYPE | LOCATION |
|---|---|---|
| CAR_DETECT_4.CAR_DET | (IN DISCRETE 5DC) | EXIT |
| AIR_FLOW.AIR_FLOW_SE| | (IN ANALOG 10DC) | EXIT |
| F_1.DAMPER_POSITION | (IN ANALOG 10DC) | EXIT |
| F_1.FAN_SPEED_TACH | (IN ANALOG 10DC) | EXIT |
| FAN_1.AUX_CONTACT | (IN DISCRETE 120AC) | EXIT |
| FAN_1.FAN_OVER_TEMP | (IN DISCRETE 120AC) | EXIT |
| FAN_1.FAN_MOTOR_DRIV | (OUT DISCRETE 120AC) | EXIT |

FIG. 19

ZOOMED DIAGRAM FROM: CARWASH PROJECT BROWSER

```
                                    185 ──→ ┌─────────────────────────────────────┐
                                            │              CARWASH                │
                                            │                                     │
  ₵ ENTRY.CAR_DETECT_1.CAR_DETECT ──────────┤ ENTRY_DETECT   INTERNAL_1  ENTRY_CONV│
  ₵ ENTRY.CONVEYOR.AUX_CONTACT ─────────────┤ ENTRY_AUX      INTERNAL_2  CAR_LENGTH│
  ₵ ENTRY.CONVEYOR.OVER_TEMP ───────────────┤ ENTRY_OV_TEMP  INTERNAL_3  WASH_PUMP │
  ₵ ENTRY.CAR_PULL.CONV_SPEED_TACH ─────────┤ ENTRY_SPEED                WASH_VALVE│
  ₵ ENTRY.CAR_LENGTH.LENGTH ────────────────┤ ENTRY_LENGTH               WAX_PUMP  │
  ₵ WASH.CAR_DETECT_2.CAR_DETECT ───────────┤ WASH_DETECT                WAX_VALVE │
  ₵ WASH.SPRAY_PUMP.AUX_CONTACT ────────────┤ WASH_AUX                   DRY_FAN   │
  ₵ WASH.SPRAY_PUMP.OVER_TEMP ──────────────┤ WASH_OV_TEMP                         │
  ₵ WASH.SOAP_WATER.IN_2 ───────────────────┤ WASH_IN_2                            │
  ₵ WASH.LEVEL.SOAP_WATER_LEVEL ────────────┤ WASH_WATER_LEV                       │
  ₵ WASH.WATER.VALVE_OPEN ──────────────────┤ WASH_VALVE_OPEN                      │
  ₵ WAX.CAR_DETECT_3.CAR_DETECT ────────────┤ WAX_DETECT                           │
  ₵ WAX.M_1.AUX_CONTACT ────────────────────┤ WAX_AUX                              │
  ₵ WAX.M_1.OVER_TEMP ──────────────────────┤ WAX_OV_TEMP                          │
  ₵ WAX.WAX_SPRAY.WAX_FLOW ─────────────────┤ WAX_FLOW                             │
  ₵ WAX.WAX_1.WAX_1_OPEN ───────────────────┤ WAX_1_OPEN                           │
  ₵ WAX.WAX_2.WAX_2_OPEN ───────────────────┤ WAX_2_OPEN                           │
  ₵ DRY.CAR_DETECT_4.CAR_DETECT ────────────┤ DRY_DETECT                           │
  ₵ DRY.FAN_1.AUX_CONTACT ──────────────────┤ DRY_AUX                              │
  ₵ DRY.FAN_1.FAN_OVER_TEMP ────────────────┤ DRY_OV_TEMP                          │
  ₵ DRY.AIR_FLOW.AIR_FLOW_SENSOR ───────────┤ DRY_AIR_FLOW                         │
  ₵ DRY.F_1.DAMPER_POSITION ────────────────┤ DRY_DAMP_POS                         │
  ₵ DRY.F_1.FAN_SPEED_TACH ─────────────────┤ DRY_FAN_SPEED                        │
                                            └─────────────────────────────────────┘
```

FIG. 36

METHODS FOR SET UP AND PROGRAMMING OF MACHINE AND PROCESS CONTROLLERS

REFERENCE TO MICROFICHE APPENDIX

Microfiche Appendix A with 4 fiche and a total of 339 frames is incorporated in this specification.

BACKGROUND OF THE INVENTION

1. Field of the Invention

The field of the invention is computerized controllers for controlling a machine or process in an industrial or commercial environment, and more particularly methods for constructing application programs for such controllers.

2. Description of the Background Art

Graphical programming aids, as disclosed in Kossiakoff, U.S. Pat. No. 4,315,315, and Kodosky et al., U.S. Pat. No. 4,901,221, use a programming computer to display a data flow diagram as a graphical representation of a computer program, typically for a second computer. This graphical representation of a computer program is then compiled into an actual program file for operation in the second computer.

For machine or process controllers, several types of graphical programming languages are known. One type is the ladder diagram type, which was developed from relay logic diagrams. The uprights of the ladder diagram represent the high and low side of a power supply circuit. The rungs of the ladder complete a circuit path when the logical elements in the rung are analyzed to produce a logic true result for the rung. Another type of programming language is the sequential function chart, in which an industrial process is analyzed as a series of alternating steps and transitions. Another type of programming language is the function block diagram where a block in a program may be assigned various mathematical, logical or other types of functions to relate inputs to outputs. Before designing a program for an individual controller processor, the controller hardware must be selected and arranged. Controller equipment is sold in units and modules which can be selected and arranged ("configured") in many different numbers and types to make up the system or systems controlling the particular industrial operation. An important consideration in this configuration of the hardware is the determination of the input and output points (I/O points) in the controller system. At these I/O points an input device, for example a pushbutton, sends an electrical signal to the controller system, or an output device, for example a solenoid, receives an output signal from the controller system.

Many controller systems are set up and installed by engineers who specialize in that task. There is a desire to aid a greater number of industrial customers, both large businesses and small, in understanding, installing and using controller equipment. To this end it is desired to provide an easy-to-use and intuitive graphical user interface for a desktop computer, for analyzing an industrial process, configuring the hardware and developing programs for execution by the controller hardware.

SUMMARY OF THE INVENTION

The invention relates to methods for analyzing an industrial or commercial process, configuring controller hardware and developing program for execution by that controller hardware. These methods are practiced with graphical editing software that runs on a desktop computer.

A first graphical editing task, which shall be referred to as a process editing task, is used to diagram the industrial or commercial process. A second graphical editing task, which shall be referred to as a hardware editing task, is used to diagram the configuration of the controller hardware. A third graphical editing task, which shall be referred to as a program editing task, is used to diagram one or more programs for the processor units in the controller hardware. The graphical controller program developed with these graphical editing tasks can then be compiled into an operational program for a controller processor in the controller system.

The process and hardware graphical editing tasks are particularly helpful in arranging data to be input to the program editing task.

Process I/O signals are identified using the process editing task and these are conveyed to the hardware editing task.

The process editing task groups the I/O signals in the process according to location and type for easier matching with the controller hardware.

Using the hardware editing task, the process I/O signals are related to hardware I/O points. The hardware editing task uses a two-layered icon to simulate the physical units of controller hardware including the important relationship of I/O modules to I/O chassis. The hardware I/O points are then conveyed to the program editing task, where they are related to program variables.

The graphical editing tasks have common constituent parts, including a selection bar at the top, a tree graph window immediately below the selection bar, a graph editing window below the tree graph window, and a palette of graphical tools displayed along the left-hand side of the graph editing window.

The tree graph window shows the relationship or hierarchy of graphs within a graphical editing task. It can also be used to select the opening and display of a particular graph within the graph editing window.

The palettes have a pair of oppositely directed scrolling arrows, which are selected by operating a mouse input device, to cause the scrolling or simulated rotation of the palettes, so that multiple palette panels can be associated with each palette. This gives each editing task the ability to add graphical nodes, and then further characterize these nodes by location, and by the number and type of inputs and outputs to the node, using a sequence of palette panels.

One object of the invention is to provide an intuitive, easy-to-use user interface for set up and programming of programmable controller equipment. The general techniques of the invention are further applicable to programming of other types of industrial equipment such as motor controls, motion control equipment, operator interface logic and special purpose displays and vision systems.

Another object of the invention is to provide a metaphor to existing programmable controller hardware as used and understood by those in the art of industrial control.

Other objects and advantages besides those discussed above shall be apparent to those of ordinary skill in the art from the description of a preferred embodiment of the invention which follows. In the description, reference is made to the accompanying drawings, which form a part hereof, and which illustrate examples of the invention. Such examples, however, are not exhaustive of the various embodiments of the invention, and therefore reference is made to the claims which follow the description for determining the scope of the invention.

BRIEF DESCRIPTION OF THE DRAWINGS

FIGS. 5–43 are further screen displays showing the operation of the methods and program of the present invention.

DETAILED DESCRIPTION OF THE PREFERRED EMBODIMENT

Figure 1:
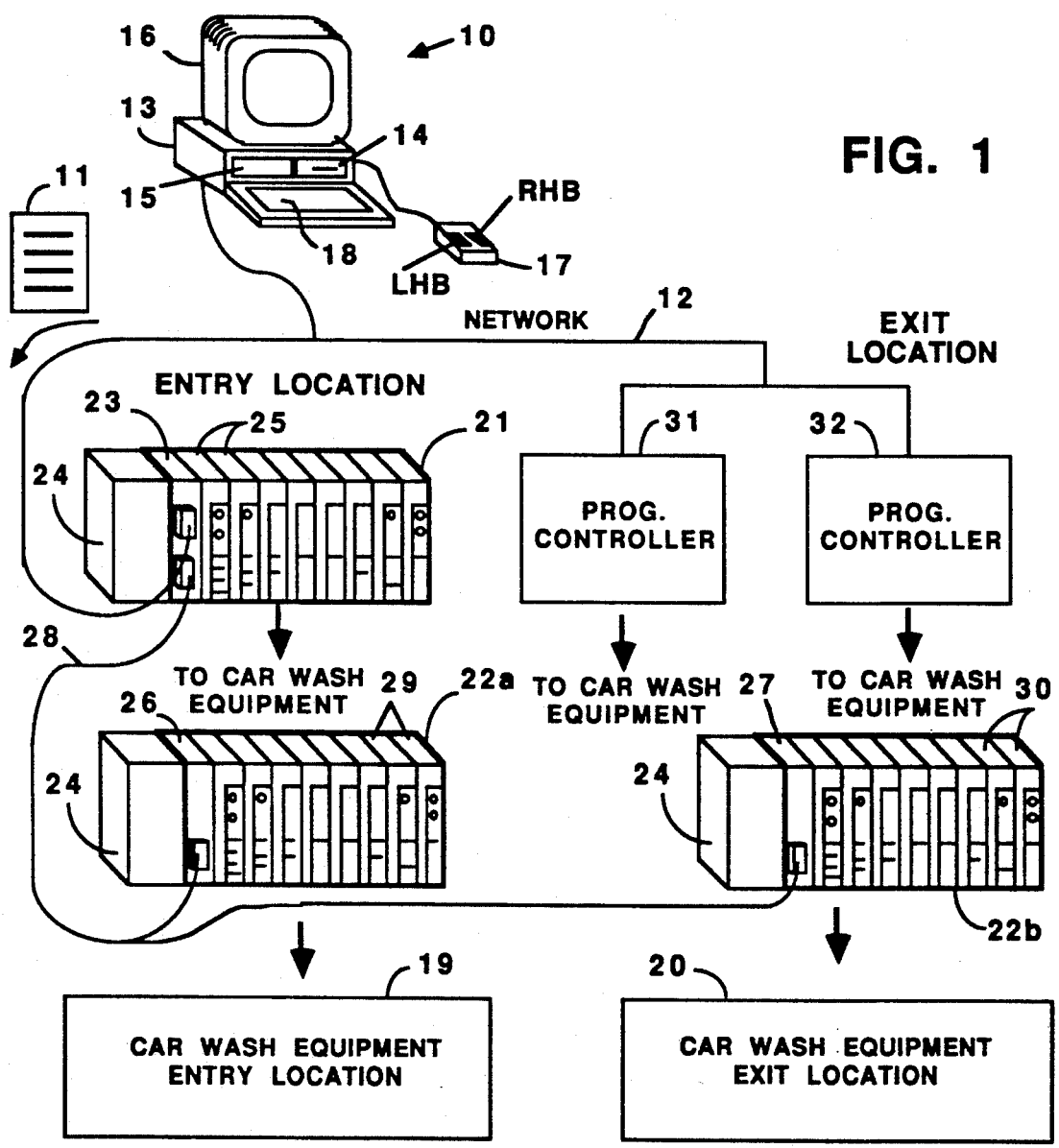
FIG. 1 is a control system diagram for a car wash which includes a programming computer in which the methods and program of the present invention are used.

A. The Application of the Invention to a Computer-Based Control System

The invention is practiced on a programming computer 10 with graphical programming software for programming an electronic controller in one of several high-level graphical programming languages. Each graphical program is then compiled into a program file 11. The program file 11 is transferred via diskette or via a network 12 to a target processor 23 in a computerized controller system for controlling a commercial or industrial process or machine—in this example, the equipment at a car wash.

The programming computer 10 includes a Compaq 286 or Compaq 386 desktop computer 13 with one disk drive 14, four megabytes of internal RAM memory (not shown) and a hard disk 15 of twenty megabytes capacity. The computer 13 is loaded with the MS-DOS operating system, Version 3.31 (not shown). A graphics monitor 16 is equipped with a suitable graphics controller and is connected to the computer 13 to provide for visual output to the user. The user input devices for the personal computer 10 include a mouse 17 and a keyboard 18. The mouse 17 has two buttons, a right hand button (RHB) and a left hand button (LHB).

As seen in FIG. 1, certain car wash equipment 19 is located near the entry of the car wash and certain car wash equipment 20 is located near the exit of the car wash. A first programmable controller for controlling equipment in the car wash includes one processor chassis 21 and two remote I/O chassis 22a, 22b, the second I/O chassis 22b being located at the exit. The processor chassis 21 holds a modular system processor module 23 in its left-most slot. The processor chassis 21 also has a power supply 24 attached to one side and a group of I/O modules 25 in other slots. The programming computer 10 is connected to this module 23 through the first network 12 mentioned above. The processor module 23 is also connected to adapter modules 26, 27 in the I/O chassis 22a, 22b to communicate input and output status data to I/O modules 29, 30. This connection is made through a remote I/O master-slave, serial data network 28. The I/O modules 25, 29, 30 in all chassis 21, 22a, 22b connect through wiring (not shown) to the equipment in the car wash 19, 20.

The general functions of the controller processor module 23 and the I/O modules 25, 29, 30 are well known to those of ordinary skill in the art. The controller processor module 23 executes a control program, sometimes also referred to as a user's application program, because the program is developed in a user program language for one of many possible industrial applications. In executing the program, the controller processor module 23 generates output status data in response to the state of input status data and according to the logic contained in the user control program.

At some predetermined interval, the controller processor module 23 executes an I/O scan in which input status data is read from those of the I/O modules 25, 29 and 30 that are input modules, and output status data is written to those of the I/O modules 25, 29 and 30 that are output modules.

The I/O modules 25, 29 and 30 that are input modules convert AC and DC signals from input devices, such as sensors, limit switches and pushbuttons, to digital logic-level signals that can be stored as input data. The I/O modules 25, 29 and 30 that are output modules convert digital logic-level signals to AC and DC signals for operating output devices such as relays and solenoids. The I/O modules 25, 29 and 30 connect to these input and output devices on the car wash equipment 19, 20 through swing-arm connectors with screw-type terminals of a type well known in the art.

A control program or user's application program for the controller processor 23 is entered on the programming computer 10 as a high-level graphical diagram, using graphical programming software that runs on the programming computer 10. The controller program file 11 is then compiled into executable code. This file 11 is then transferred to the controller system processor 23.

In addition to the first programmable controller comprising the electronic controller equipment in chassis 21, 22a and 22b, two other programmable controllers 31 and 32 are provided to control car wash equipment at the exit location. These controllers 31 and 32 also have controller processors connected to the first network to receive program files downloaded from the programming computer 10.

Besides the operating system, the programming computer is loaded with software for graphically representing and then generating the controller program files 11. The programming software is developed using the Smalltalk/V-286 programming language and application development program available from Digitalk, Los Angeles, Calif. This development program allows for creation of runtime application programs (called image files) by entering instructions in the object-oriented Smalltalk programming language.

For background information and specifications on this program and the hardware for operating it, reference is made to the Smalltalk/V Tutorial and Programming Handbook, copyright 1988 Digitalk, Inc.

Although the Smalltalk/V development program is offered with basic windowing and bit-mapped graphics, it provides no straightforward technique for building graphical interfaces with direct manipulation (point and click with a mouse), nor does it provide for connected graphs and graphical editors in a graphical programming language.

B. The Smalltalk Programming Language

The Smalltalk programming language is one of several object-oriented programming languages. These languages are used to construct objects or data structures which can be very complex, and include such things as zoomable windows. Objects have "attributes" which give them individual characteristics. Each object has the ability to manipulate its own internal attributes. An object encapsulates its attributes such that other objects cannot manipulate these attributes directly. Objects communicate with each other by sending messages and these messages may request the second object to do something to its attributes. Many different types of objects may respond to the same message.

From a programming point of view, the object's attributes take the form of data in a data structure and each object has its own data structure. A class defines a data structure for a related group of objects. The class of an object also defines the program methods that the object uses to manipulate its data and data structure. In the Smalltalk language, methods may be thought of as sequences of instructions to carry out a certain procedure relative to such objects and their data. A method is invoked in response to a message being sent to an object. The data structure and methods of one class are inherited by a new class. The new class is referred to as the subclass of the original class (which in turn is referred to as the superclass). The new subclass has all of the attributes and methods of the superclass, but can add attributes and methods of its own, including overriding methods of the superclass.

The Smalltalk development program is provided with a set of standard classes and standard methods. Subclasses can be built upon the standard classes and new methods can be added to expand the base development program into a more specific application program.

The Smalltalk programming language is applied here to create a graphical programming application. In this programming application a number of graphs are drawn on the screen. These graphs are made up of graph elements, such as nodes, vertices, or arcs. Classes are provided to define the behavior of these graph elements or objects. The graph elements can be provided with menus of commands to carry out such functions as add, remove, cut and copy, paste, update and redraw.

Figure 2:
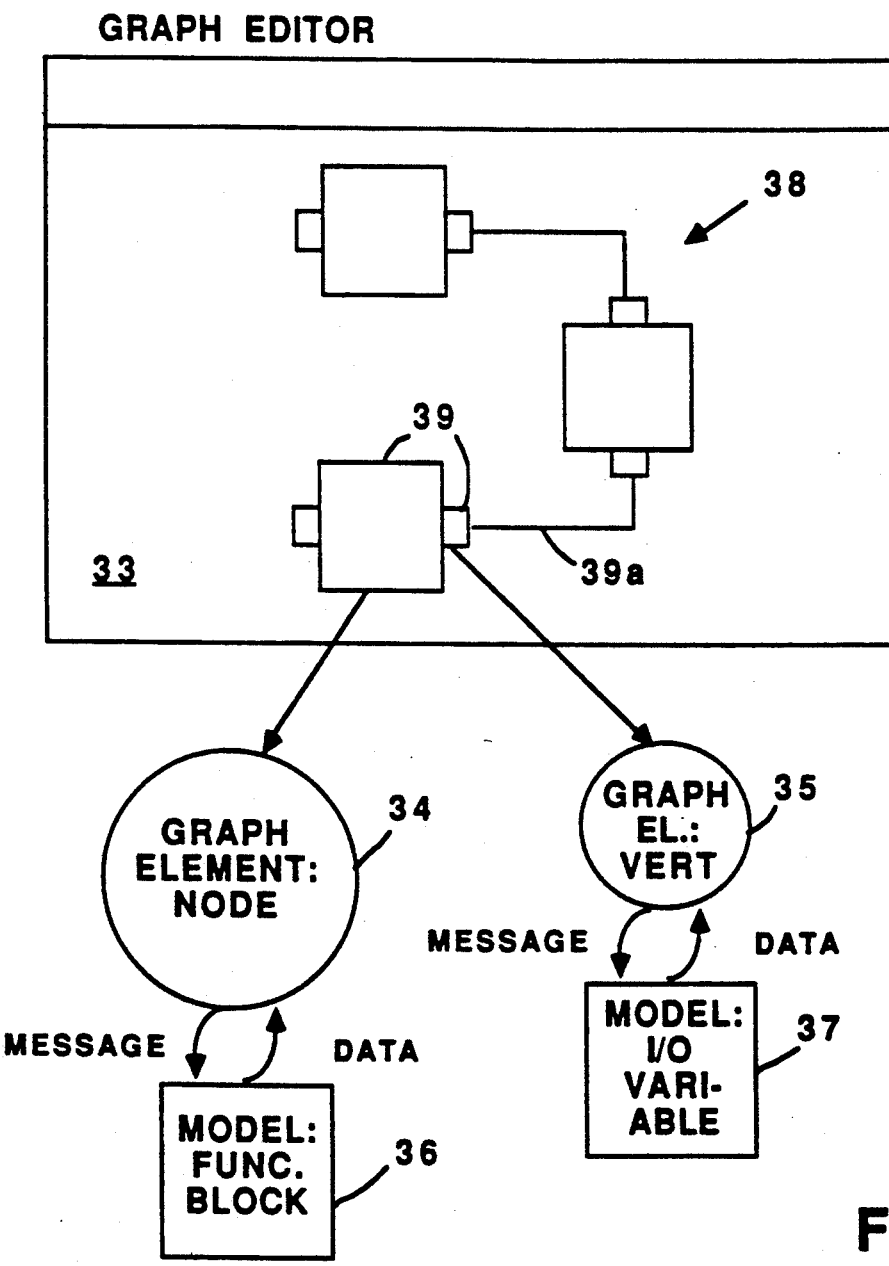
FIG. 2 is a diagram showing regions and graph elements used in the present invention.

C. Construction of a Graphical Editor with the Smalltalk Programming Language FIG. 2 shows the basic building blocks or graphical elements that will be used for the graphs in this description. Graphs 38 are displayed in a graph editing window 33 and comprise regions 39 in which specific graphical elements 34, 35 will appear. These graphical elements are nodes 34, subnodes, vertices 35 (sometimes called "verts") and arcs. The arcs are lines that appear in a subclass of regions known as arc regions 39a.

A function block, something like a "black box", is an example of a node. This node may have one or more sub-nodes and one or more vertexes (also referred to as vertices). Vertices are used as connection points on nodes. Arcs are the lines which connect one vertex on one node to a second vertex on a second node and thus construct the connected graph.

The node and vert graph elements 34, 35 are associated with certain models, which are subparts or attributes of the graph element class and its node, vert and arc subclasses. A "function block" is one model of a node. An input or output (I/O) variable is one model of a vert. In the operation of this Smalltalk application program, a model of a node responds to messages from the node and passes data to the node 34.

As an example, the node model 36 may respond to a set of messages sent by its node 34 as follows.

In response to a "Graphic Model" message, the model returns data containing a graphical representation of the model. This graphical representation will be displayed in the graph editor window 33 as the graph 38 is being edited.

In response to the "Select Operation" message, which occurs when the cursor enters the graphic region 39 representing the model, the model returns a message to perform one of two operations. The first is to highlight the graphic region; the second is to invoke a text editing operation on a graphic region that is representing text.

In response to the "Left Click Operation" message, when the user clicks with the LHB of the mouse 17 on a graphic region 39 representing the model, the model returns a message to perform one of three operations. The first is to invoke a dragging operation to allow the graphic region to be dragged and repositioned by the editor; the second is to invoke a rubberbanding operation which allows graphic regions to be connected together; and the third is to dispatch a "choose" message to the model being represented by the graphic region.

In response to a "Verts" message, the node model 36 is responsible for returning a collection of vertices contained by that node. This collection is based on the state of the node model 36 and is determined by the number of connection points it should have. For example, a node model 36 for a function block would return a collection containing a vert for each one of its inputs and outputs.

In response to a "Sub-Nodes" message, the node model 36 is responsible for returning a collection of sub-node objects that the node 34 should contain. Sub-nodes are similar to verts but contain no connection behavior. Sub-nodes are used to represent information within the model that needs to be manipulated by the user. Typically, sub-nodes contain a text string to be displayed and edited. For example, a function block would be a node model 36 and would return a sub-node used to represent its name.

In response to a "Menu" message, the node model 36 provides a menu of operations that the user can choose to perform on the model 36. The model 36 also provides the methods for carrying out these menu items. These model menu selections may add to menu selections provided by the Graph Element class and a Node Subclass.

Figure 3A:
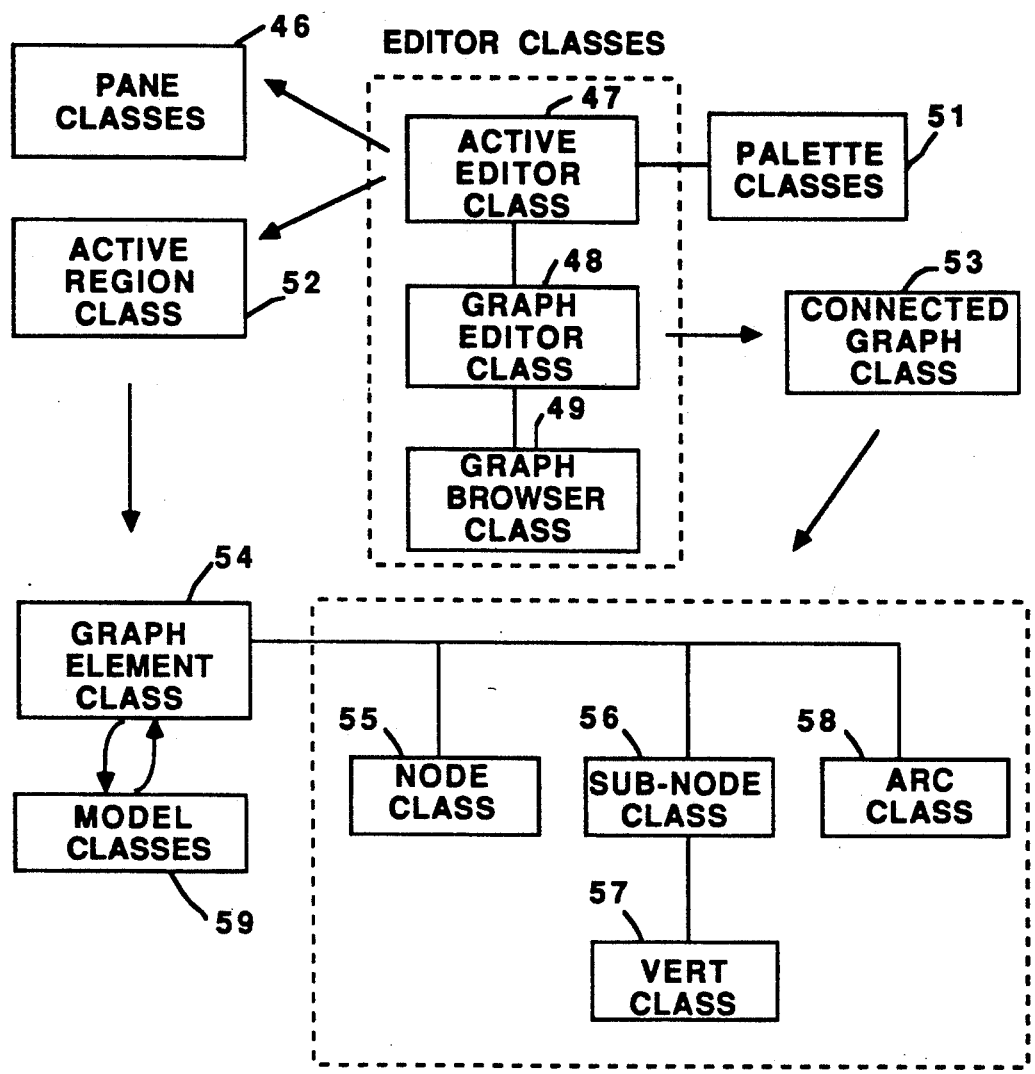
FIG. 3a is a block diagram representing a portion of the object-oriented program of the present invention.

FIG. 3a illustrates base classes that have been added to the standard classes of the Smalltalk development program. The base classes include some editor classes which provide a graphical editor of the type seen in FIG. 5, where a graphical editor provides data and methods for display of a browsing window 40, which further includes a title bar 41, a selection bar 42, a tree graph window 43, a graph editing window 33 and an editing tool palette 45.

Figure 3B:
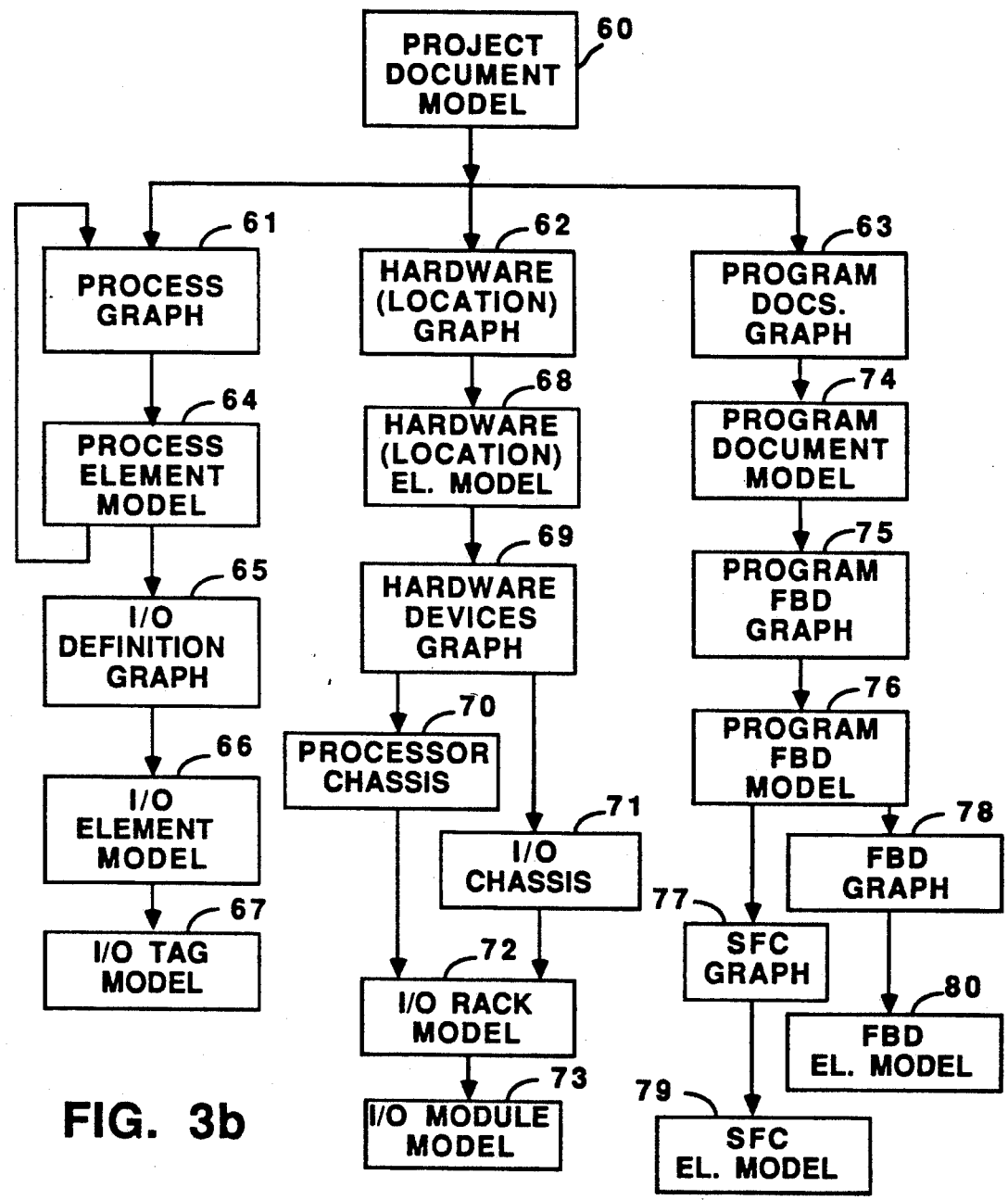
FIG. 3b is a block diagram representing a portion of the object-oriented program of the present invention.

FIG. 3a illustrates the base classes that have been added to the Smalltalk standard classes to provide a graphical editor. FIG. 3b illustrates Connected Graph subclasses and Model classes and subclasses that have been added to the Smalltalk standard classes to provide the particular type of nodes, verts and arcs to carry out this application for programming of machine and process controllers.

Appendix A lists the Smalltalk code for base classes and Model classes that have been added to the standard Smalltalk classes to provide support for this example. The classes in Appendix A are all subclasses of the Smalltalk class named "Object". Pages 1-3 of Appendix A provide a Class hierarchy in which the direct subclasses of "Object" are signified by the notation (.Subclass). A subsequent subclass noted (..Subclass) would be a subclass of (.Subclass). Some of the first-tier subclasses that will be described herein are: activeEditor; palette; connectedGraph; graphElement; the Model classes under graphElementModel; region; and pane. The description herein will not necessarily follow the conventions for upper case/lower case and word spacing used in the Smalltalk listing and application program. Instead of "lowercaseUppercase", an underscore (_) will sometimes be used to associate two words in text label, such as "CAR_DETECT_4". Initial capital letters will be used for Smalltalk class names.

As seen in FIG. 3a, the Editor classes include the Active Editor class 47, the Graph Editor class 48 and the Graph Browser class 49. These classes are instrumental in putting together the pieces to form what is ultimately seen on the screen of the programming computer 10 as the browsing window 40 and its contents.

In the base classes, the graph editing window 33 is referred to as a "Pane" within the browsing window 40, however, in this description, this pane will be referred as the graph editing window 33, which is tiled (side-by-side as opposed to overlapping) with other windows and elements to form the larger browsing window 40.

The Active Editor class 47 receives data from the Pane classes 46 and the Region class 52 to help put together the background information to display the browsing window 40. One function of the Pane classes 46 is to convert from whole screen coordinates to coordinates within the graph editing window or pane. The Active Editor class 47 receives mouse events and menu selections from the Pane class to control scrolling and zooming of the graph editing window 33.

The Active Editor class, represented by block 47 in FIG. 3a, adds, deletes and displays regions 39 within the graph editing window 33. The Region classes 52 work in tandem with the editor classes 47-49 by managing individual graphical regions 39 within the graph editing window 33. The active regions contain graph elements, which are generally defined by the abstract Graph Element Class 54 and more specifically defined by the subclasses 55-58 for node, sub-node, vert and arc. These subclasses in turn communicate with the Model classes 59 which define specific types of nodes, sub-nodes, verts and arcs.

There is one specialization of the Active Region class for handling the connection of arcs. Arcs are connecting links within a connected graph. Arcs are handled like lines, whereas the nodes 34 and verts 35 are handled like bit-mapped objects in regions 39.

Some particular relationships exist between the types of graph elements: node, vertex, arc and sub-node. A node is an object which may contain a number of sub-nodes or a number of vertices from which connections are made by arcs to the vertices of other nodes. A vertex can be associated with multiple arcs. The sub-nodes do not connect to one another; they may be, for example, an item of text for labeling a node.

A Graph Editor class 48, which is a subclass of the Active Editor class 47, adds the manipulation of regions 39 by dragging and connection. The Graph Editor class 48 controls the dragging of single or multiple regions 39 within the graph editing window 33, the connection of regions 39 by arcs 39a, the dispatching of tools to the region 39, and the addition of nodes 34 to the graph 38.

Figure 5:
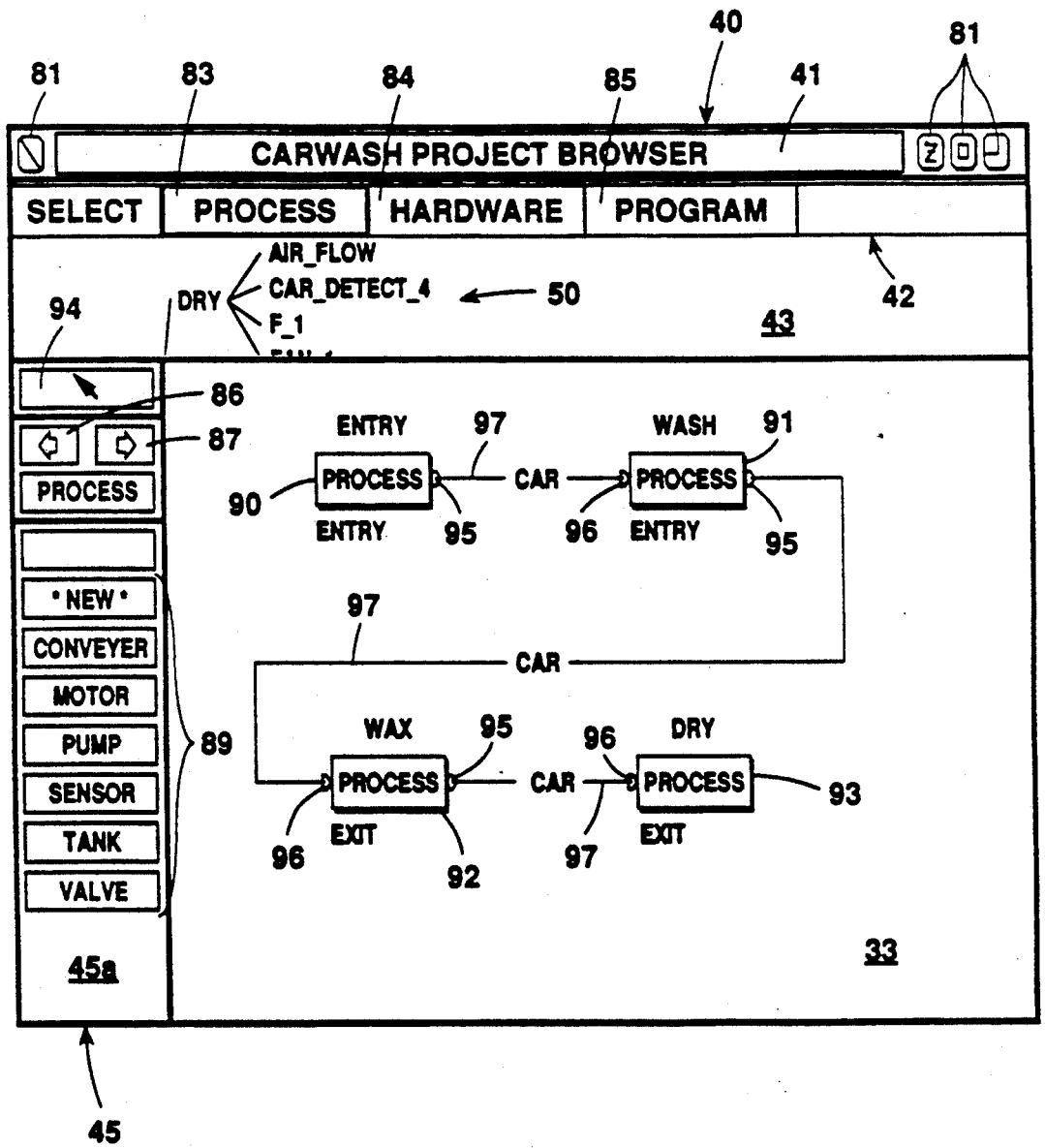

The editing tool palette 45 seen in FIG. 5 is the result of a group of Palette classes 51 in FIG. 3b, which are subclasses of the Active Editor class 47. An individual tool in the palette in FIG. 5 is chosen by moving the mouse-controlled cursor over it and pressing the LHB to select (clicking on) the tool, which then becomes the current active editing tool. When the mouse-controlled cursor is next clicked on an open area of the graph editing window 33, the selected type of palette item is added to the graph. The palette allows graph elements to be quickly added to a graph.

A Connected Graph class, represented by block 53 in FIG. 3a, carries out the basic functions needed to relate nodes, verts and arcs in a connected graph 38. There are subclasses of this Connected Graphs class 53 to define many types of connected graphs.

For example, the model for a node could be a "function block"; the model for a vert could be an I/O variable. The Model Classes 59 and the Graph Element classes 54 are operationally connected through the message interface as described earlier in relation to FIG. 2.

Figure 6:
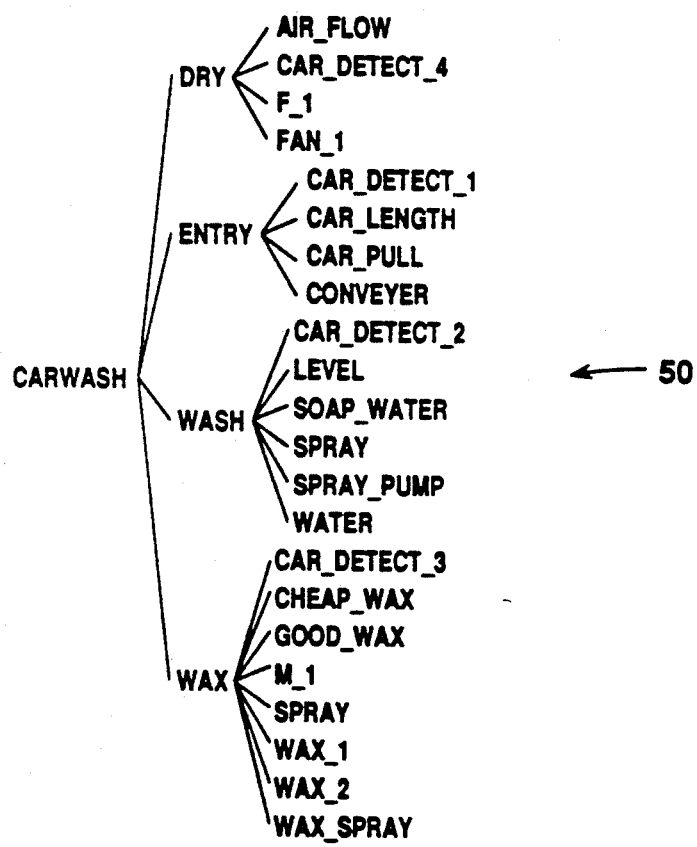

As seen in FIGS. 5 and 6, the browsing window 40 includes a tree graph 50 that illustrates a hierarchy of graphs within any particular editing task. Branches or nodes of the tree represent a particular diagram within the graph hierarchy. Selecting a tree branch or tree node will bring a corresponding graph into the graph editing window 33. This allows a complex, deeply nested graph to be quickly traversed.

The Graph Browser class, represented by block 49 in FIG. 3a, is a specialization of Graph Editor class 48. The Graph Browser class 49 displays the hierarchical tree structure in the tree graph window 43 above the graph editing window 33 in FIG. 5. It also makes changes in the tree graph 50.

In summary, the editor classes 47-49 in FIG. 3a are responsible for a) dispatching of mouse events to graphical regions 39 in FIG. 2, b) updating the contents of the graph editing window 33, c) displaying and aligning graphical regions 39 to a grid, d) printing of the connected graph 38, e) displaying palettes 45, and f) dispatching palette tool commands to the graph 38 and to graphical regions 39.

Referring next to FIG. 3b, there is a summary of the Graph Classes and Model Classes which provide the particular connected graph diagrams in the application program.

Figure 20:
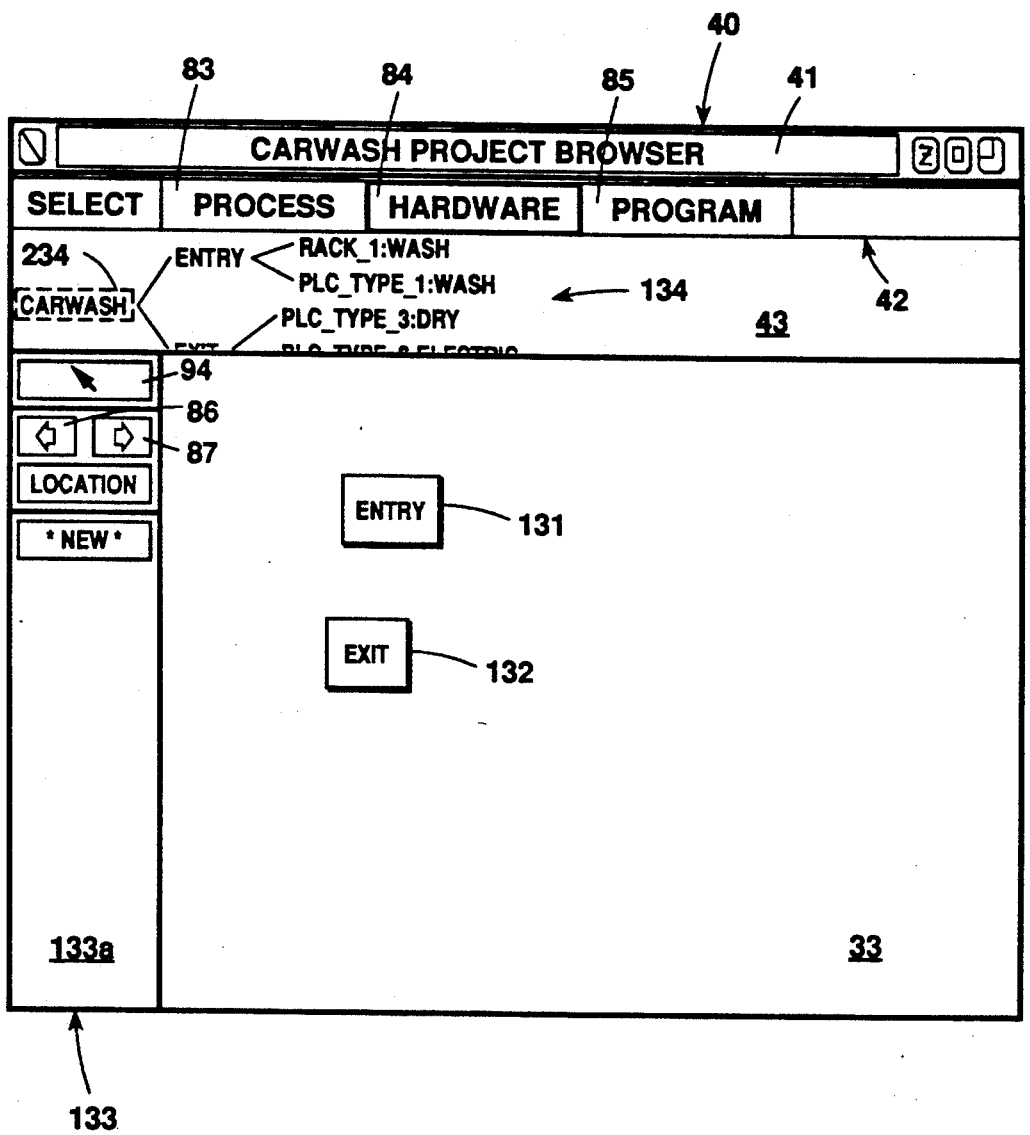
Figure 33:
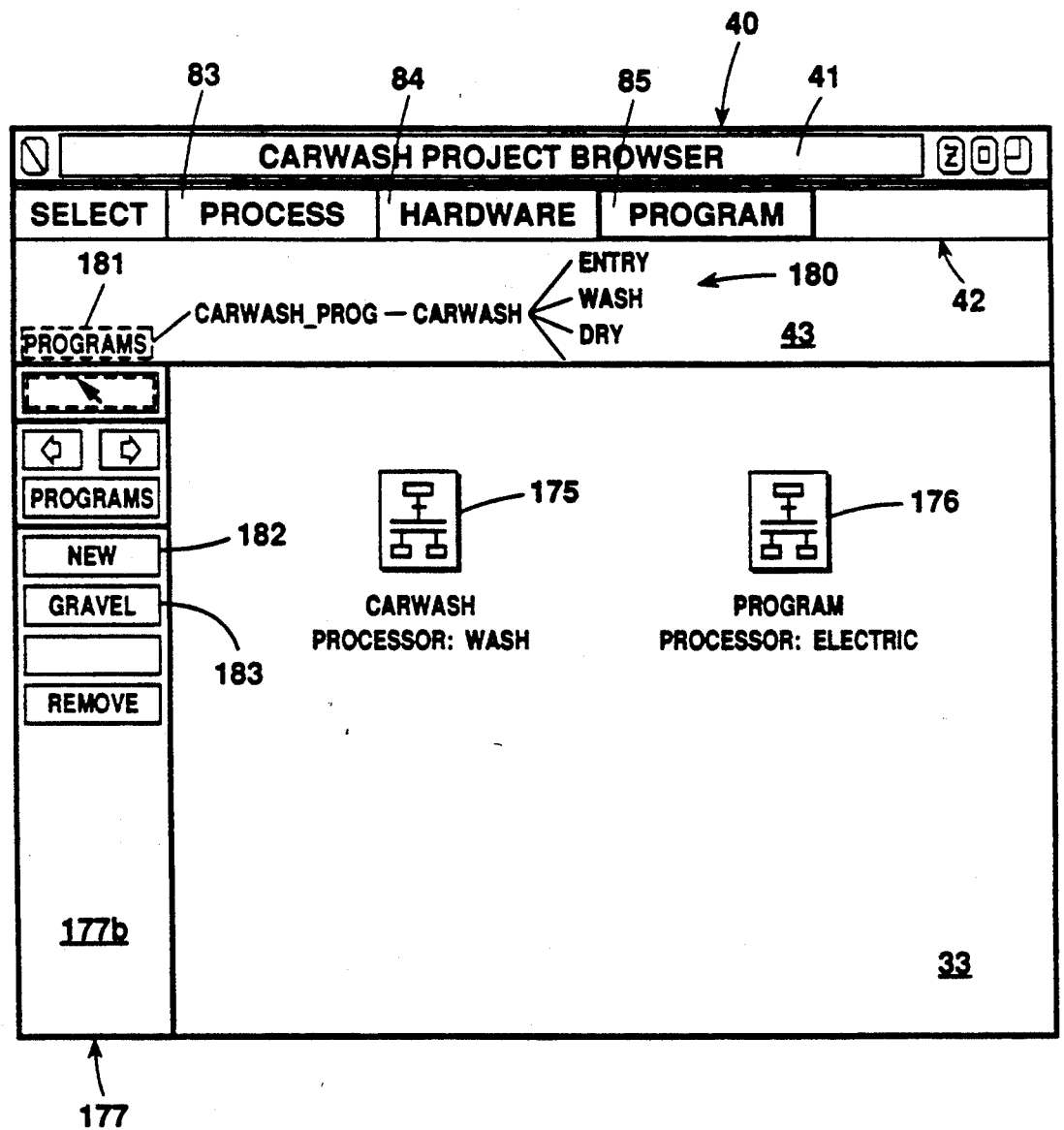

A Model Class 60 is provided for Project Documents. A "project document" is represented by the icon 82 in FIG. 4. Project document is a classification of the present application program as it relates to a desktop window seen in FIG. 4, The graphical editor program to be described will execute three editing tasks. The editing tasks are known as the PROCESS, HARDWARE and PROGRAM editing tasks. Within each task, graphs defined by the Connected Graph class 53 will be viewed in the editing window 33. There is therefore a graph for the PROCESS editing task that is seen in FIG. 5. The collection of objects in this graph is defined by a PROCESS Graph class 61 represented in FIG. 3b. A graph for the HARDWARE editing task is defined by a HARDWARE (Location) Graph class 62 and is seen in FIG. 20. A graph for the PROGRAM editing task is defined by a PROGRAM Graph class 63 and this graph is seen in FIG. 33.

The nodes 90-93 in the PROCESS Graph in FIG. 5 are sub-parts or cycles within a car wash operation. These nodes 90-93 are defined by the PROCESS Element Model class 64 in FIG. 3b. The loop back from the the PROCESS Element Model class 64 to the PROCESS Graph class 61 in FIG. 3b shows that other graphs can be nested within nodes 90-93 in FIG. 5.

At the lowest level of the PROCESS graphical hierarchy is a single block graph known as an I/O Definition block graph and this is seen in FIGS. 11-15. This is defined by a subclass 65 of the Connected Graph class seen represented in FIG. 3b as "I/O Definition Graph". The single node in this graph is an I/O Definition block which is defined by the I/O Element Model class represented by block 66 in FIG. 3b. This node may include a number of inputs and outputs and these would be defined by the I/O Tag Model class 67 represented in FIG. 3b.

Figure 22:
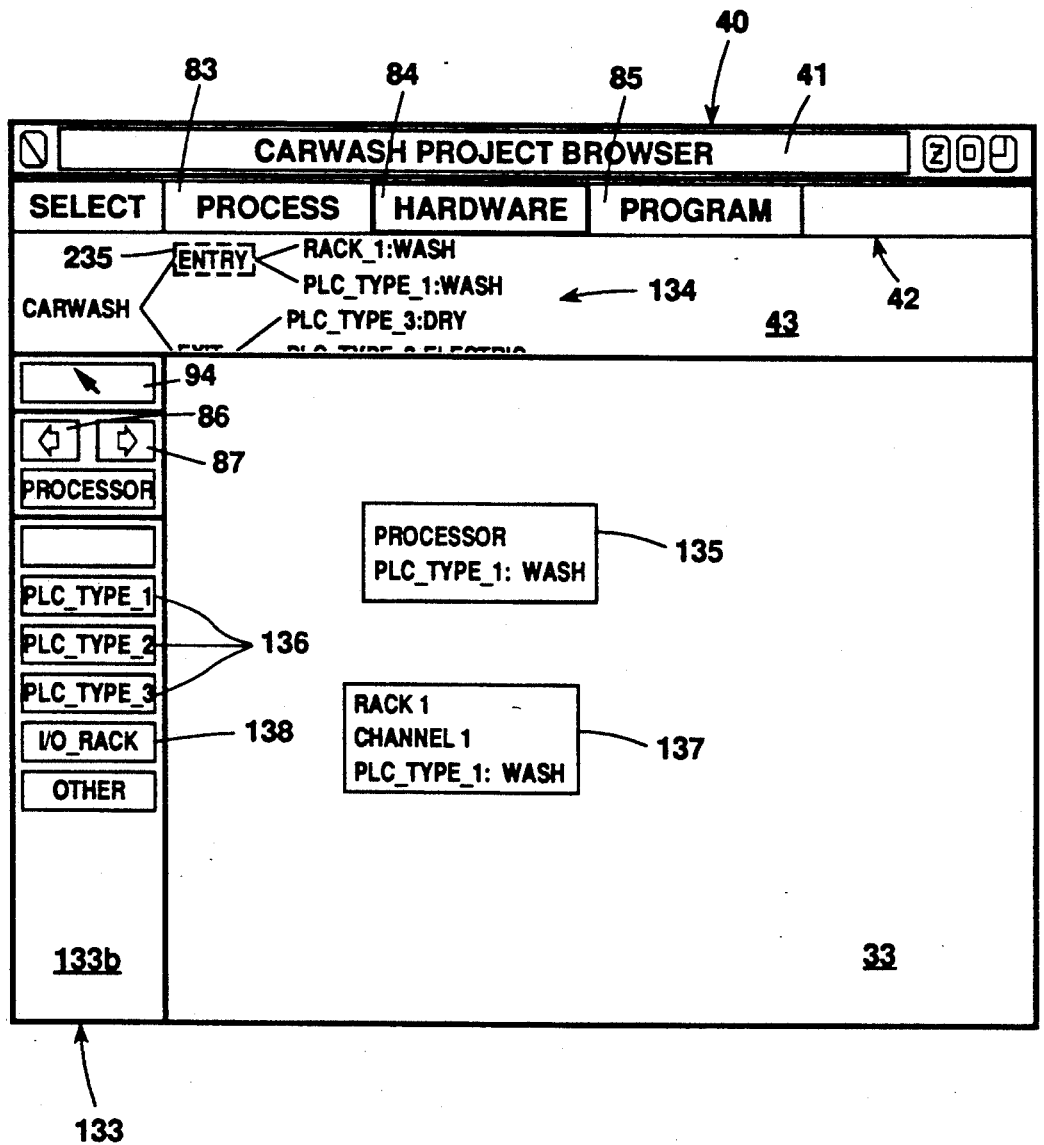
Figure 23:
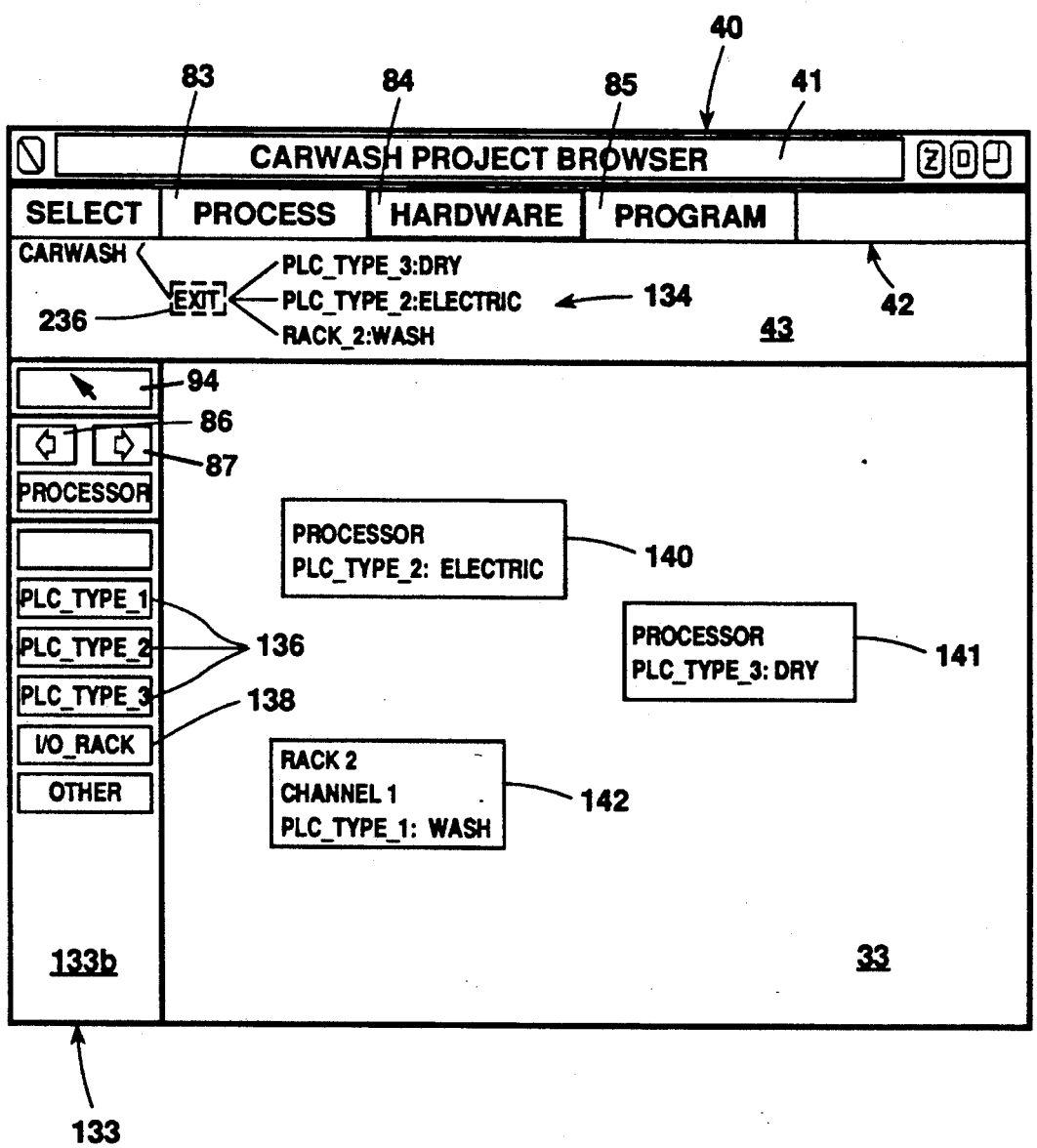
Figure 24:
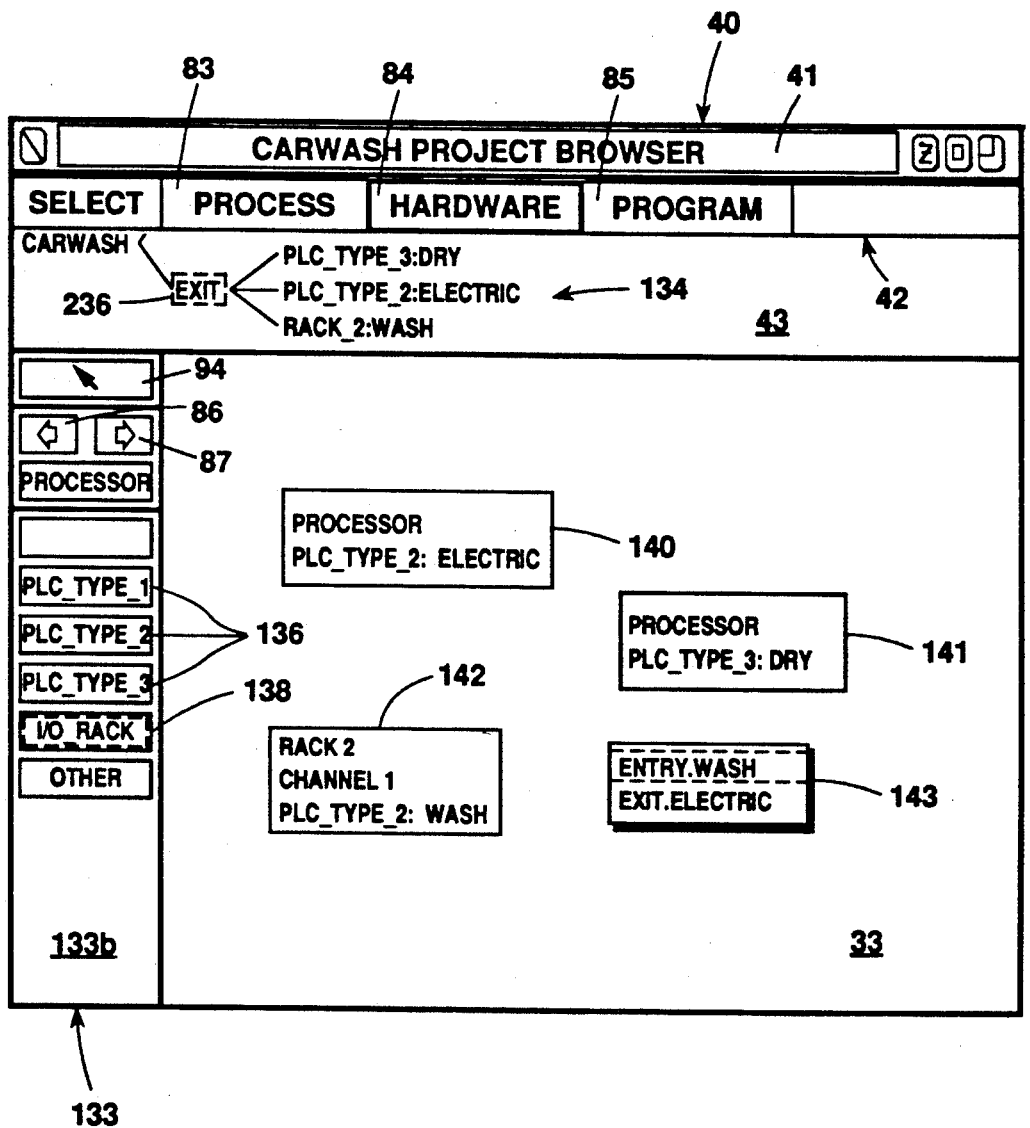

The nodes in the HARDWARE (Location) Graph in FIG. 20 are defined by the HARDWARE Location Element Model class 68 represented in FIG. 3b. HARDWARE Devices Graphs can be nested within nodes 131, 132 in FIG. 20. These HARDWARE Devices Graphs are seen in FIGS. 22-24, and are defined by a HARDWARE Devices Graph class represented by block 69 in FIG. 3b. Examples of the nodes in the Devices Graphs are seen in FIGS. 22-24. These nodes are defined by the Model classes 70 and 71 for a processor chassis and an I/O chassis, respectively. These nodes are displayed graphically to represent the processor chassis 21 and the I/O chassis 22a in FIG. 1, as well as the other programmable controllers 31, 32.

Nested within these chassis nodes is a node for which the Model class is the I/O Rack Model class 72 represented in FIG. 3b. This class 72 provides the data and methods to display a graphical image of a rack structure seen in FIGS. 25-27, which can be either a processor chassis 21 or the I/O chassis 22a, 22b seen in FIG. 1. This graphical image node can contain a collection of sub-nodes for which the model is defined by the I/O Module model class 73 represented in FIG. 3b. This class defines a graphical image for a controller I/O module that can be superimposed over the image of an I/O rack to simulate positioning of the I/O module in the physical I/O rack.

Referring to the subclass for the PROGRAM DOCUMENTS graph represented by block 63, the nodes in this graph are one or more program icons as seen in FIG. 33. The Model class for these nodes is represented by block 74. These nodes each hold a one-block function diagram graph of their respective programs as exemplified in FIG. 36. This diagram or graph is defined by the Connected Graph subclass represented by block 75 in FIG. 3b. The nodes in this graph are defined by the Model class represented by block 76. At this point in the PROGRAM editing task, the user is given the option, through a menu, of programming in sequential function chart (SFC) graphical language or in a more detailed function block diagram (FBD) language. Assuming the first option is selected, an SFC Graph class defines the diagram for this language as represented by block 77, and the SFC nodes are defined by SFC Element Model classes and represented by block 79. Not illustrated in FIG. 3b, but also included in the application program are classes for the SFC verts. Assuming the second option is selected, a FBD Graph class defines the diagram for this language as represented by block 78, and the FBD nodes are defined by FBD Element Model classes represented by block 80. Not illustrated in FIG. 3b, but also included in the application program are classes for the FBD input and output variables.

Using these classes and others, as more particularly defined in Appendix A, a graphic application program can be constructed for programming machine or process controller equipment.

D. The Graphical Programming Interface for Digital Controllers

1. The Car Wash Application

Figure 4:
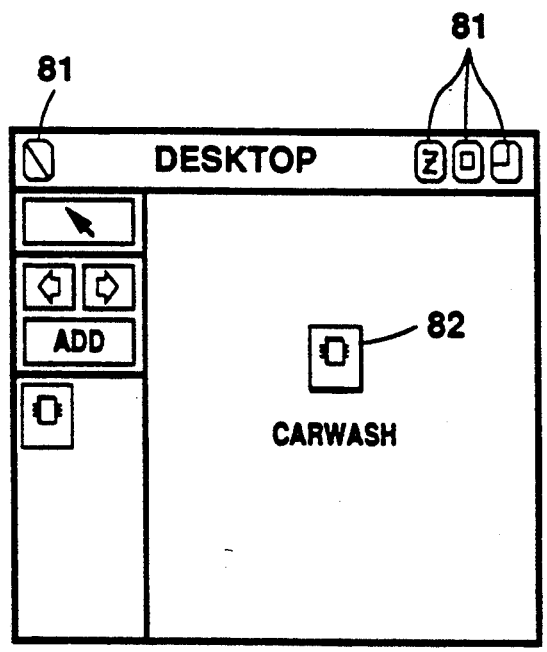
FIG. 4 shows a screen display at start up of the method and program of the present invention.

The car wash application is loaded into the hard disk memory 15 in FIG. 1 and on startup of the hardware, a desktop window appears as seen in FIG. 4. It will be noticed that each window in the application has some basic window tool icons 81 to select the functions of 1) closing the window ( ), 2) zooming out to enlarge the portion of a graph seen in the window (Z), 3) a title bar only selection, and 4) a resize window command. These functions are provided by the standard classes received with the Smalltalk programming language.

The graphical programming interface is started up by selecting an icon 82 seen in FIG. 4 for the "CAR WASH" application program. The application is opened by moving the mouse 17 to position a cursor on the "CAR WASH" icon 82 and by operating the right hand button (RHB) of the mouse 17 to open a menu (not shown). The menu includes the command "edit" which is selected by dragging the mouse 17 to highlight the command and then operating the LHB on the mouse 17. This opens or starts up the application.

2 Three Graphical Editing Tasks

Referring next to FIG. 5, this particular graphical programming interface includes a graphical editor with three graphical editing tasks, named PROCESS, HARDWARE and PROGRAM. These editing tasks are like applications or individual tasks and run one at a time by the graphical editor. The graphical editing tasks are selected using a selection bar 42 with selection areas 83, 84, 85 for the three specific editing tasks. Besides the graphical editing tasks described herein, other graphical editing tasks can be added for other tasks related to set up and programming of electronic controllers, such as the connection of programmable controllers in a network.

a) Common Features of the Graphical Editing Tasks

Each editing task has a browser window 40 as seen in FIG. 5 with the selection bar 42 near the top, just below the caption for the browser window 40. Below the selection bar 42 is the tree graph window 43. In this window, a tree graph 50 is partly displayed in FIG. 5. The full tree graph is displayed, as seen in FIG. 6, by executing the "zoom (out)" command. To execute this command, the cursor is positioned in the tree graph window 43 and the RHB on the mouse 17 is operated to open a menu with the "zoom" command. The command is then selected by moving the cursor to it and operating the LHB on the mouse 17. Generally, the RHB of the mouse 17 is used to open menus and LHB is used for selecting or clicking on commands and objects.

Below the tree graph window 43 in FIG. 5 is an editing window 33. The tree graph 50 defines the relationship of a group of views of connected graphs and graphical objects which can be called up one-by-one to the editing window 33. As seen in FIGS. 5 and 6, the car wash application 82 has been defined as having four process nodes or branches, labeled ENTRY, WASH, WAX and DRY, which are four cycles in the car wash operation. These are displayed in alphabetical order in FIG. 6, but another order could be used. These branches or nodes are subdivided further and each connect to a lower tier of graphical objects. For the DRY cycle seen in FIG. 5, these objects are labeled AIR_FLOW, CAR_DETECT_4, F_1 and FAN_1. Each branch of the tree graph 50 represents an object or graph which has been stored in the memory of the computer 10 and which can be displayed and edited in the graph editing window 33. To open an object for editing, a branch of the tree graph is selected by 1) moving the mouse-controlled cursor over the branch or node of the tree graph 50 and 2) clicking the LHB to select the tree node and a corresponding graph for viewing and editing in the graph editing window 33. When selected, the node in the tree graph 50 is displayed in a shaded box, which is represented by the dashed line boxes 50a, 50b, 50c and 50d in FIGS. 7-10. The tree graph 50 is drawn automatically by the program of the invention as the parts of the industrial or commercial process are added in the editing window 33.

To the left side of editor window 33 in FIG. 5 is a multi-panel graphical editing tool palette 45, in which only one panel 45a is visible at a time. There are two oppositely directed, horizontally pointing, scrolling arrows 86, 87 near the top of the palette 45. The panels of the palettes 45 are changed by moving the mouse-controlled cursor over one of the two arrows 86, 87, and pressing the LHB. (This moving of the cursor and then executing a selection action with the LHB shall be referred to as a "clicking on" operation.) Each time a scrolling arrow 86, 87 is clicked on, the palette 45 rotates in the appropriate sense or direction to the next panel.

b) Description of the PROCESS Editing task

Figure 7:
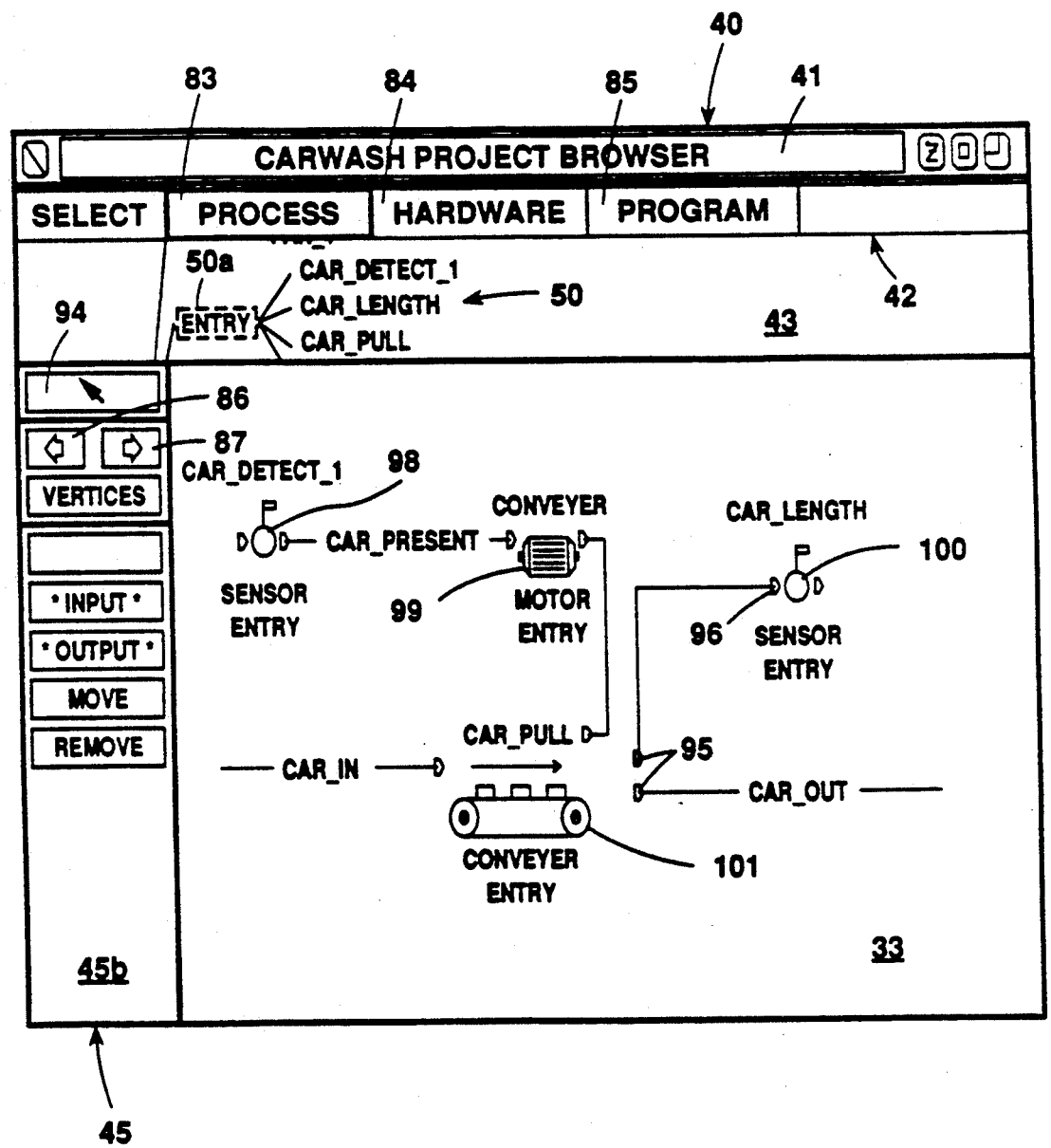
Figure 10:
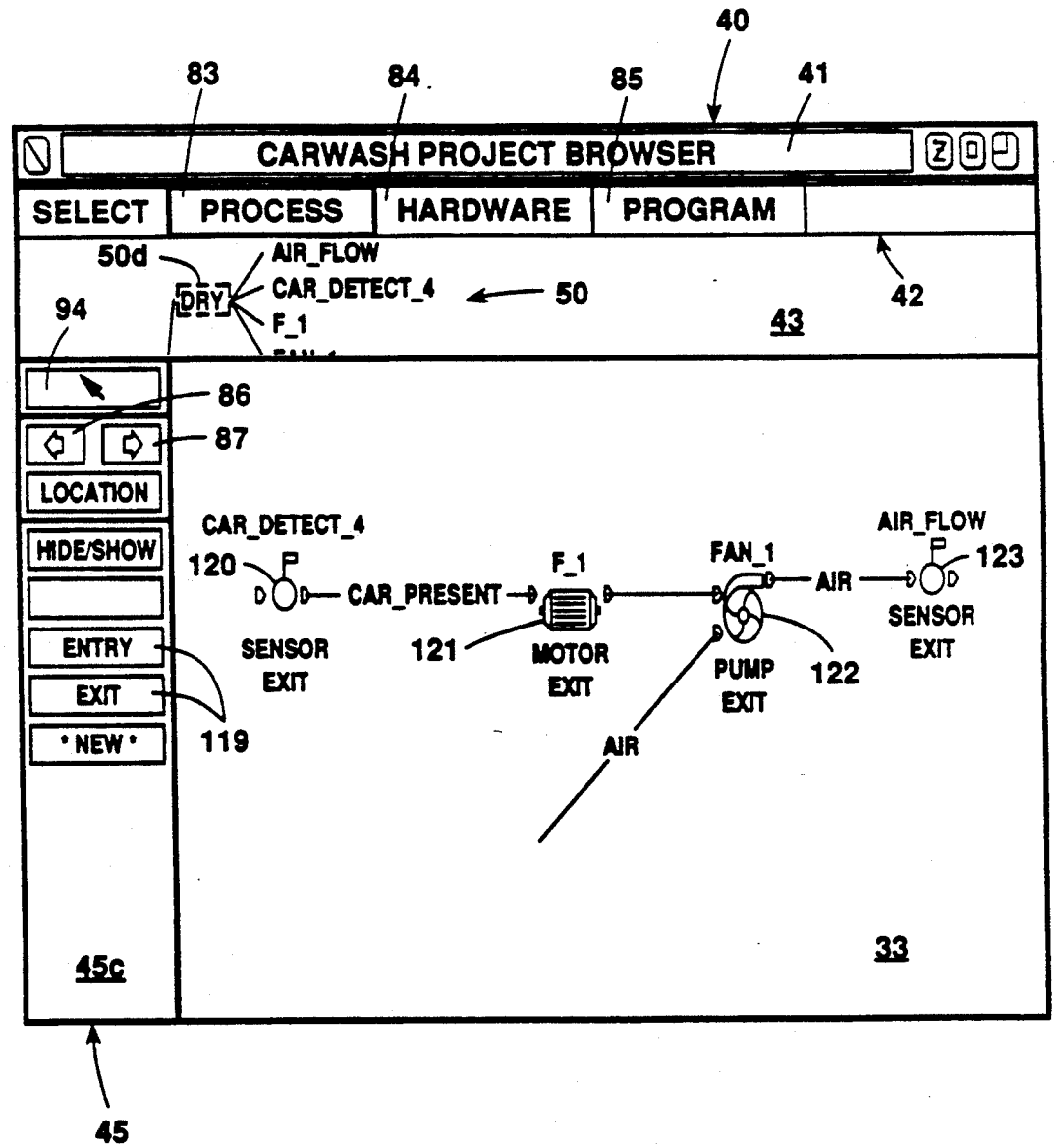

As seen in FIGS. 5, 7 and 10, three panels of the palette 45 in the PROCESS graphical editing task are labeled PROCESS, VERTICES, and LOCATION, respectively. The PROCESS panel 45a in FIG. 5 has tool selection areas 89 for selecting a set of nodes for this particular car wash application, including CONVEYER, MOTOR, PUMP, SENSOR, TANK and VALVE. These palette tools 89 are set up through Smalltalk programming to reflect the type of equipment to be controlled in the industrial or commercial application for the electronic controller equipment. Instead of text labels, graphical icons could also be used for identifying the palette tools.

At the highest level of the PROCESS editing task, a palette tool 89 labeled "NEW" is selected to add and define new types of process function blocks in the PROCESS graph editing window 33. When a "new" node is added, a dialog box or highlighted area will prompt the user for a name for the process node. In this example, four PROCESS function blocks 90-93 were added to the graph with the names ENTRY, WASH, WAX and DRY. The PROCESS nodes are also identified by location, using a LOCATION panel 45c of the type seen in FIG. 10. Two of the tools 119 provided in this LOCATION panel 45c in FIG. 10 are "ENTRY" and "EXIT", which correspond to the areas where the equipment in the car wash is located. Selection of individual tools on all panels of the palette 45 is made by clicking on the appropriate tool. The tool 94 at the top of the palette with the diagonal arrow symbol is a tool for selecting and dragging objects in the graph editing window 33.

The process blocks 90-93 in FIG. 5 are then assigned an input vertex 96 or an output vertex 95, or both, as shown, using a VERTICES palette panel 45b of the type seen in FIG. 7. The vertices 95, 96 are then connected by arcs 97 (seen in straight lines) by using the mouse 17. The verts are connected by moving the mouse 17 to move the cursor over a vertex ("vert") and pressing the left-hand button (LHB) of the mouse 17 ("clicking on" the vert), then moving the cursor to the next vert and clicking on the second vert. When a connection is attempted by the graph editor, the vert models are first consulted to see if they agree that the connection can take place based on their type. If they agree the editor proceeds to connect the two verts with an arc. This provides a connected graph.

The PROCESS editing task uses nodes for processes, vertices (sometimes called "verts") for process connection points and arcs as the links between the vertices. The connection of arcs and verts at this level of the process is graphical—the verts are not used as input and output variables which receive changing data, as are the verts used in the PROGRAM editing task to be described below.

The palette tools 89 for SENSOR, CONVEYER, and MOTOR shown in FIG. 5 are used to create objects or nodes seen within the ENTRY node of the PROCESS in FIG. 7. These nodes or objects are represented on the screen by icons 98, 99, 100 and 101. The names CAR_DETECT_1, CONVEYER, CAR_LENGTH and CAR_PULL are alphanumeric names which are typed in and appear over the icons 98-101 for the object on the screen. The LOCATION panel 45c from FIG. 10 is activated to assign a location "ENTRY". The term "ENTRY" below each icon 98-101 in the graph editing window 33 is not referring to the "ENTRY" part of the PROCESS displayed in the tree graph 50, but is instead referring to the "ENTRY" location of the car wash equipment.

The icons in FIG. 7 are then assigned one or more input vertices 96 or one or more output vertices 95, or both, as shown, using a VERTICES panel 45b as seen in FIG. 7. The vertices 95, 96 are then connected by arcs 97 (seen in straight lines) in the manner described earlier to provide a connected graph for the "ENTRY" portion of the PROCESS.

Figure 8:
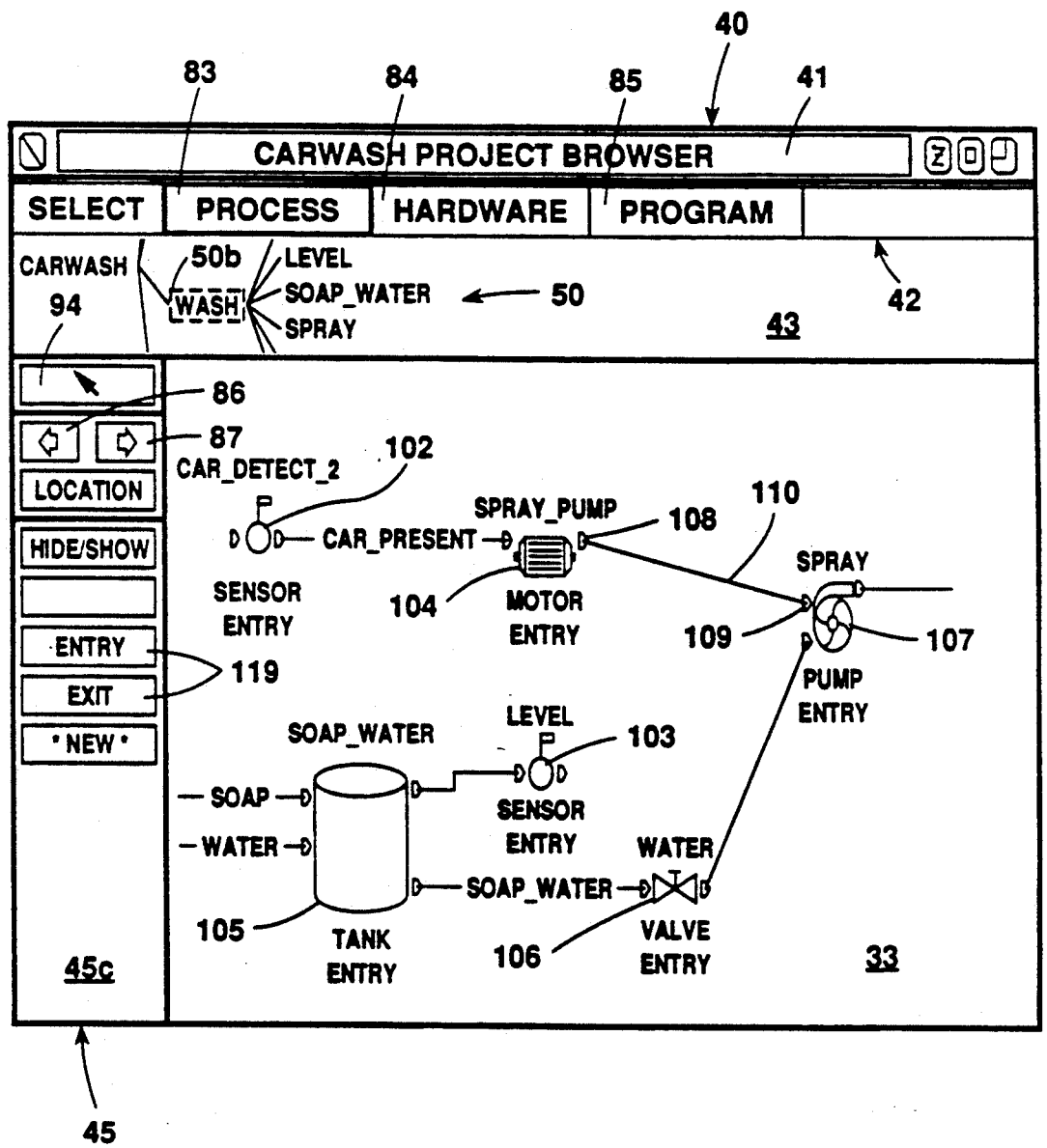

FIG. 8 shows the connected graph for the WASH part of the PROCESS. Here, a first sensor node, represented by icon 102, is given the name "CAR_DETECT_2"; a second sensor node, represented by icon 103, is given the name "LEVEL"; a motor node, represented by icon 104, is given the name "SPRAY_PUMP"; a tank node, represented by icon 105, is given the name "SOAP_WATER"; a valve node, represented by icon 106, is given the name "WATER" and a pump node represented by icon 107, is given the name "SPRAY". These nodes are added with the "PROCESS" panel 45a of the palette seen in FIG. 5. The location of each node is specified below its respective icon, using the LOCATION panel 45c from FIG. 10 as described for the ENTRY portion of the PROCESS.

The icons in FIG. 8 are then assigned an input vertex 109 or an output vertex 108, or both, as shown, using a VERTICES panel 45b seen in FIG. 7. The vertices 108, 109 are then connected by arcs 110 (seen in straight lines) in the manner described earlier for connected graphs. This provides a connected graph for the WASH portion of the PROCESS.

Figure 9:
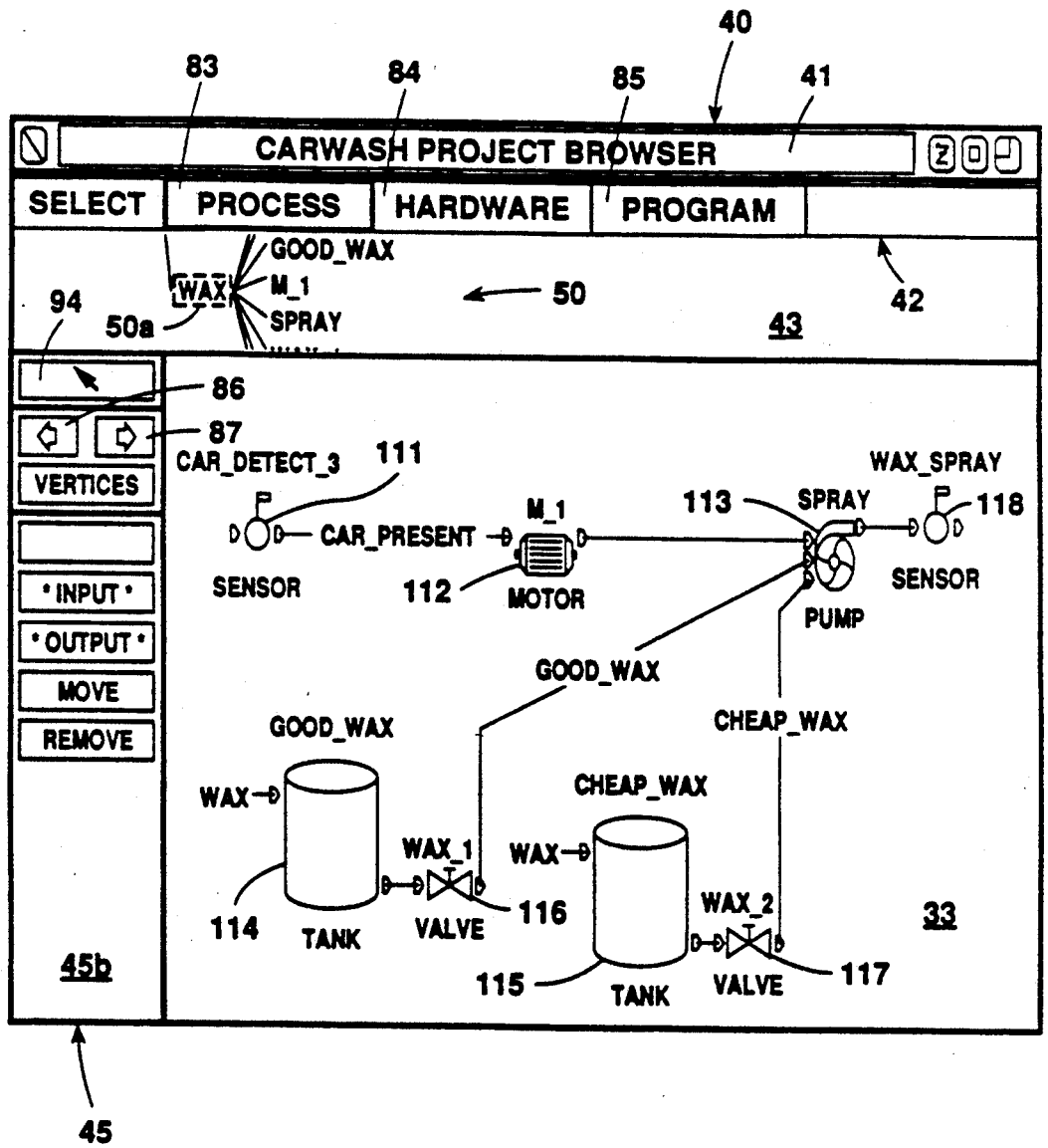

FIG. 9 shows a connected graph for the WAX part of the PROCESS. A CAR_DETECT_3 sensor, represented by icon 111, detects the presence of a car and transmits a CAR_PRESENT signal to start the motor with the name M_1, represented by icon 112. The motor M_1 drives a pump, represented by icon 113 with the name "SPRAY", which applies one of two kinds of waxes, labeled GOOD_WAX and CHEAP_WAX. GOOD_WAX and CHEAP_WAX are alphanumeric names for two respective tanks, represented by icons 114 and 115. A WAX_1 valve and a WAX_2 valve, represented by icons 116 and 117 control the flow of wax solution to SPRAY pump 113. There is also a sensor, represented by icon 118 with the name "WAX_SPRAY", to detect the flow of wax solution out of SPRAY pump 113. These nodes 111-118 are connected by verts and arcs to form a connected graph for the WASH cycle.

FIG. 10 shows a connected graph for the DRY part of the PROCESS. A CAR_DETECT 4 sensor, represented by icon 120, detects the presence of a car and transmits a CAR_PRESENT signal to start the motor with the name "F_1", represented by icon 121. The F_1 motor 121 drives an air pump with the name "FAN_1" and represented by icon 122, which applies warm air to the car. The "AIR" is seen as a process input to the air pump 122 labeled "FAN_1". There is also a sensor with the name "AIR_FLOW" and represented by icon 123 to detect the flow of air out of the FAN_1 pump 122.

Figure 11:
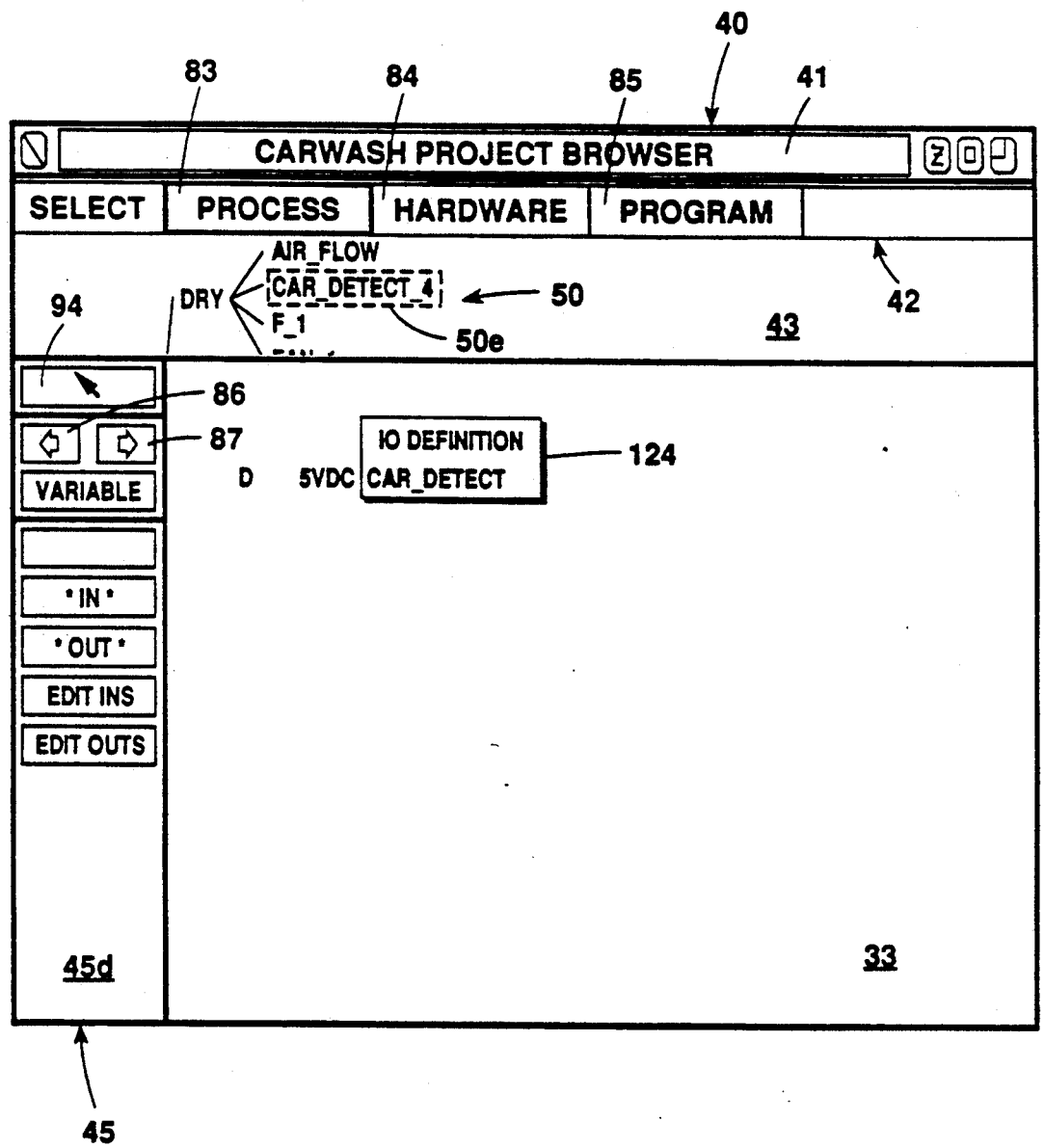

When a node is created with the PROCESS palette panel 45a, it is created with an encapsulated diagram seen in FIGS. 11-15 and a node is added to the tree graph 50. FIG. 11 shows such an I/O definition block element 124 for the CAR_DETECT_4 sensor 120. This encapsulated diagram can be displayed in the editing window 33 by clicking on the appropriate node in the tree graph 50 or executing an "edit" command from a pop-open menu. Using this diagram, the input and output signals which must be monitored or controlled relative to the CAR_DETECT_4 sensor 120 are defined from a controller viewpoint. This is illustrated with respect to the "DRY" part of the PROCESS in FIGS. 11-15, and is applicable to the other parts of the PROCESS as well.

Figure 12:
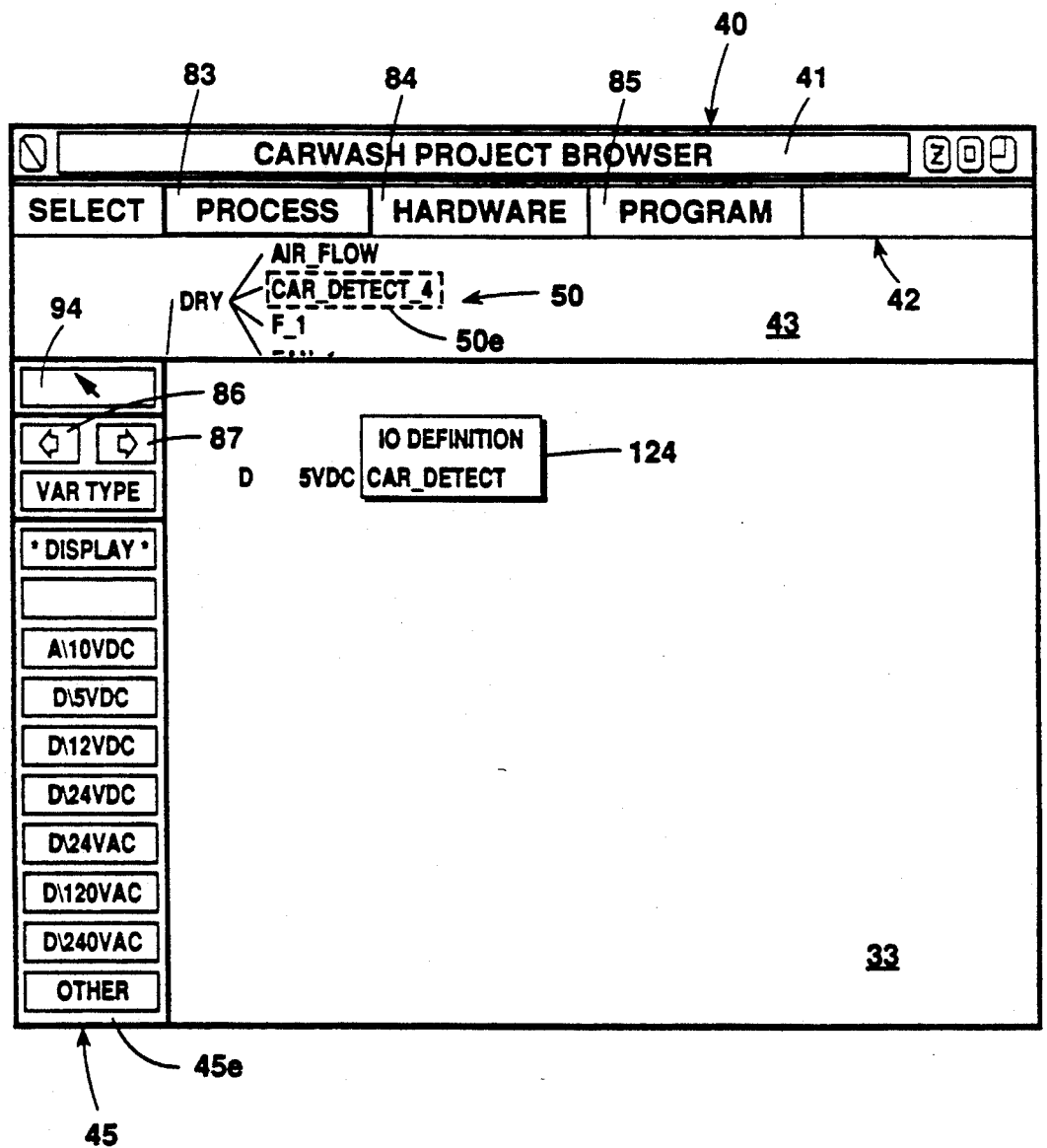
Figure 13:
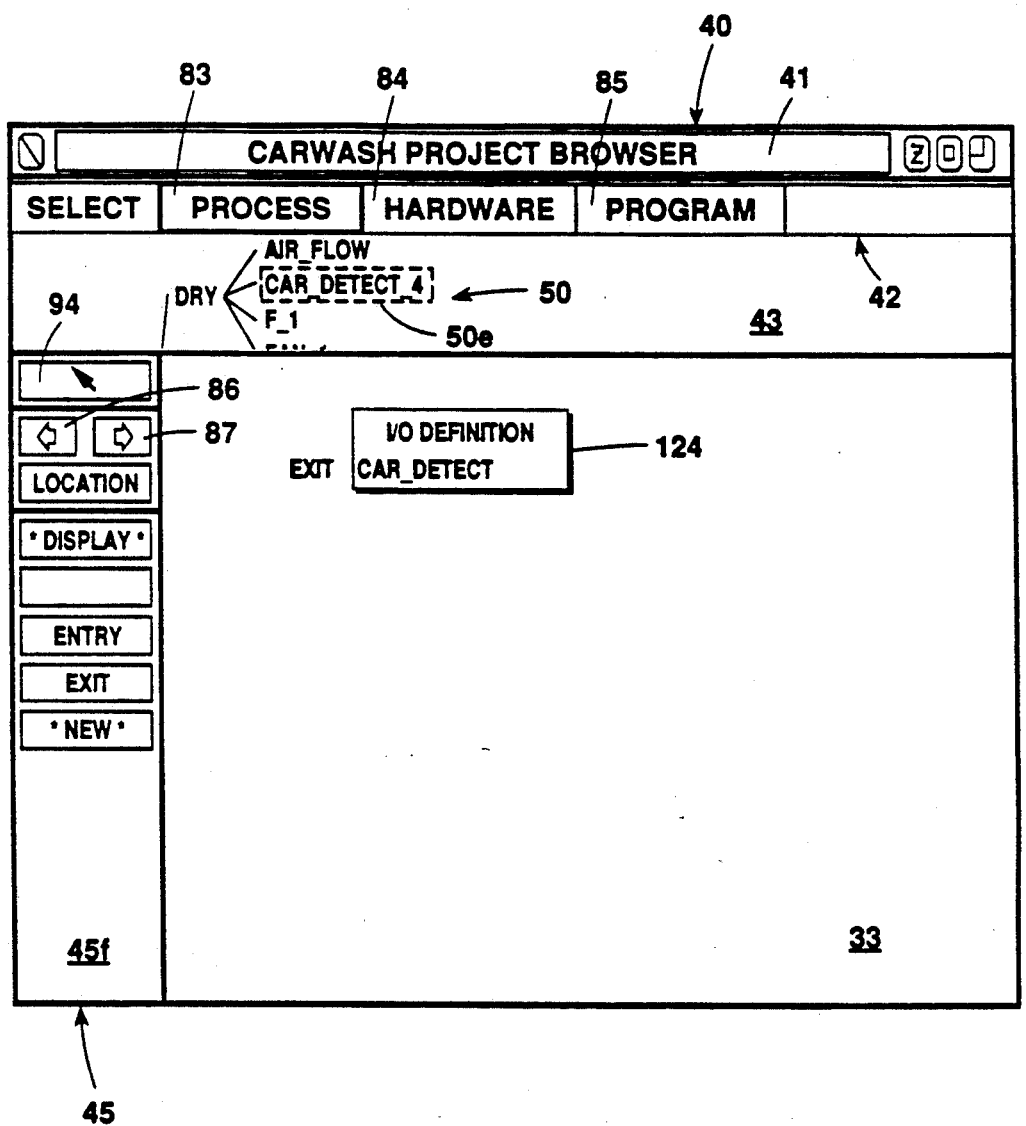

As seen in FIG. 11, the CAR_DETECT_4 sensor 120 is defined as receiving a PROCESS input signal given the name CAR_DETECT. The palette 45 for the I/O definition blocks 124 includes panels 45d, 45e and 45f labeled VARIABLE, VAR TYPE and LOCATION, respectively, as seen in FIGS. 11-13. Tools on the VARIABLE panel 45d in FIG. 11 are selected and applied to add an input variable (*IN*) or an output variable (*OUT*). Tools on the VAR TYPE panel 45e in FIG. 12 are selected and applied to define the type of electrical signal at the process input or output. In this case, the electrical signal is selected as a discrete input signal of 5 DC volts. Tools on the LOCATION type panel 45c in FIG. 13 are selected and applied to specify the location of the I/O definition block 124 relative to the available locations for the PROCESS, in this case "EXIT".

Figure 15:
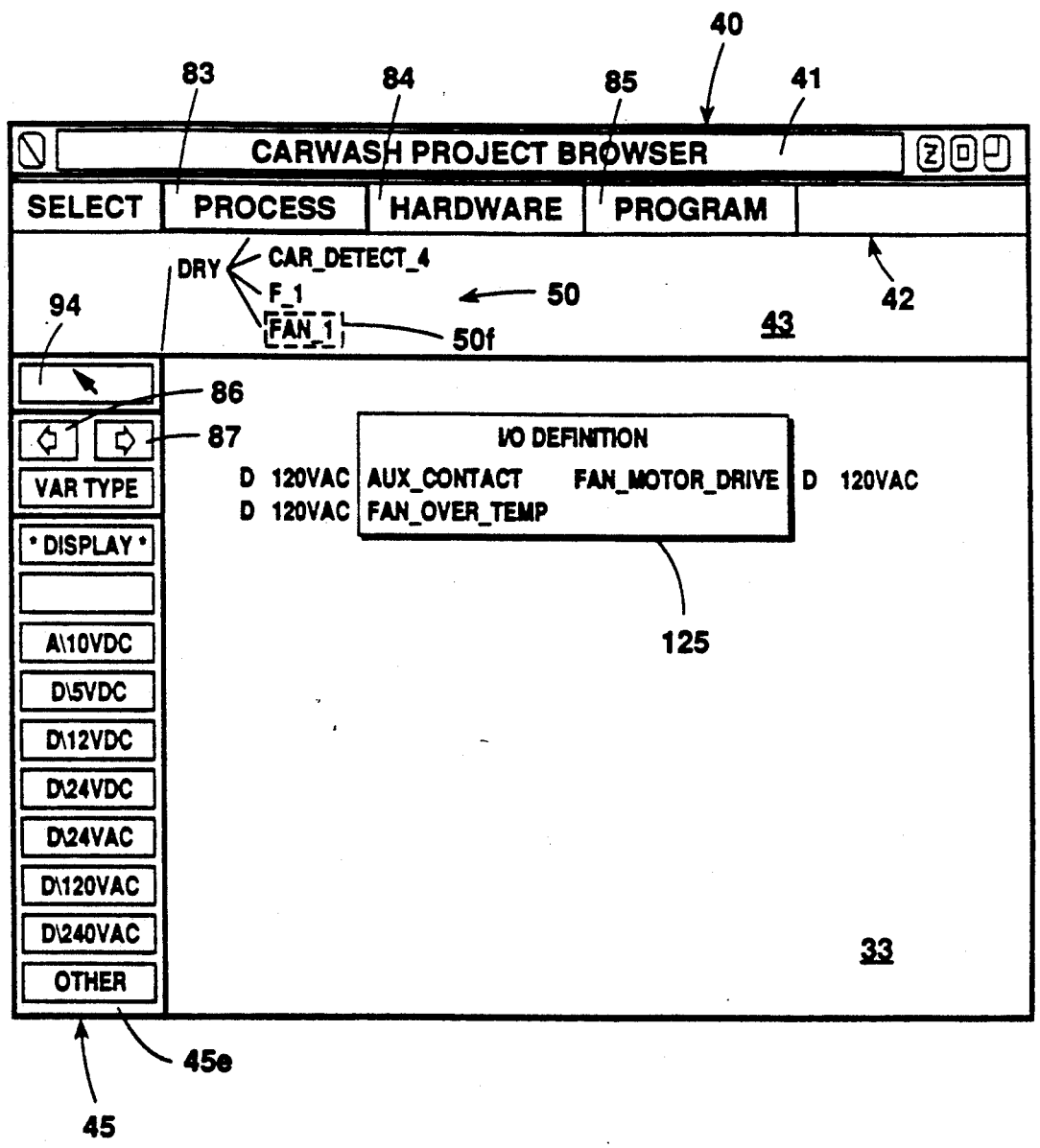

FIG. 15 shows a second example of an I/O definition block 125 for the FAN_1 air pump 122 with two inputs or conditions for turning on, AUX_CONTACT and FAN_OVER_TEMP, and an output signal labeled FAN_MOTOR_DRIVE. These have all been defined as 120-volt AC discrete signals, using the palette panel 45e labeled "VAR TYPES" for variable types.

Figure 14:
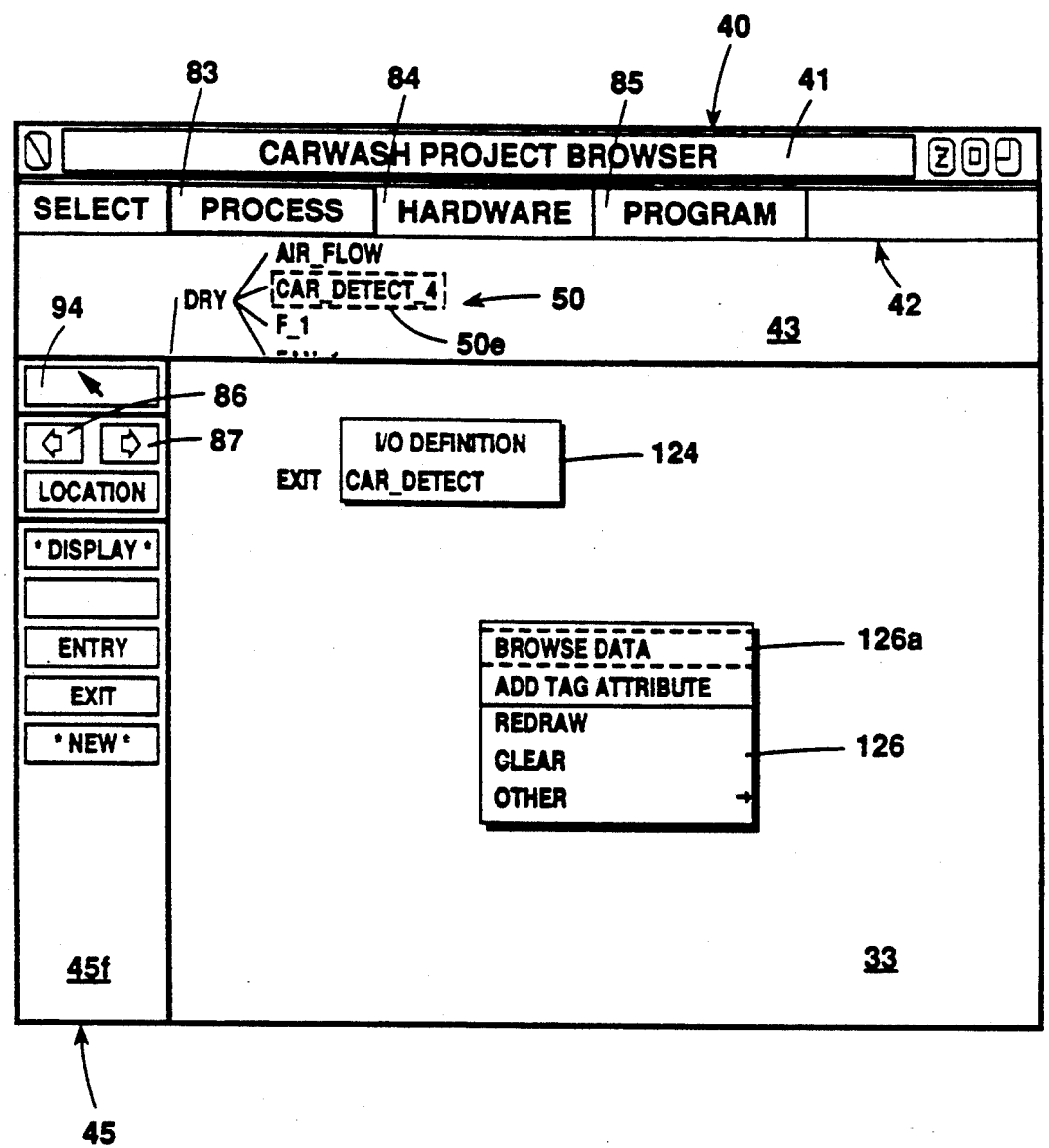

As seen in FIG. 14, by pointing (moving the cursor) to the editing window 33, and operating the RHB on the mouse 17, a menu 126 will pop open with the command "BROWSE DATA" as seen in FIG. 14. When the "BROWSE DATA" command 126a is selected by clicking on it with the mouse 17, a list 127-130 in spreadsheet form, as seen in FIGS. 16-19, opens over the editing window 33 and presents a list of input and outputs for the applicable portion of the PROCESS. These inputs and outputs are identified in the first column with their alphanumeric tag names in the format (process node name.I/O variable name). These PROCESS I/O points are defined in the second column according to their direction (IN or OUT) and their variable type (functional electrical signal). These PROCESS I/O points are further defined in the third column of the spreadsheet according to their location in the car wash (e.g. "EXIT").

FIG. 19 shows an example list 130 of PROCESS I/O points defined from a controller viewpoint for the DRY part of the PROCESS. This list 130 includes the CAR_DETECT_4.CAR DETECT input signal defined in FIG. 12. This is further defined as a 5 DC volts signal and a discrete input signal. Among the other process I/O points are the FAN_1.AUX_CONTACT input signal, the FAN_1.FAN_OVER_TEMP input signal and the FAN_1.FAN_MOTOR_DRIVE output signal defined in FIG. 15. The FAN_1.AUX_CONTACT input signal is further defined as a 120 AC volts signal and a discrete input signal. The FAN_1.FAN_OVER_TEMP input signal is further defined as a 120 AC volts signal and a discrete input signal. And, the FAN_1.FAN_MOTOR_DRIVE output signal is further defined as a 120 AC volts signal and a discrete output signal.

FIGS. 16-18 show the PROCESS I/O point data for the ENTRY, WASH and WAX parts of the PROCESS. The "BROWSE DATA" command 126a, as described for the DRY cycle, can be executed to call up a tag list 127 for the ENTRY cycle. In FIG. 16, tag CAR_DETECT_1.CAR_DETECT is a controller input signal of 120 AC volts from the CAR_DETECT_1 sensor 98. Tag CONVEYER.AUX_CONTACT is a 120 AC volts discrete input signal to a controller from the CONVEYER motor 99. Tag CAR_PULL.CAR_LENGTH is a 10-volt DC analog output signal to the CAR_PULL conveyer 101 related to sensing a car. Tag CAR_LENGTH.LENGTH is a 10-volt DC analog input signal from the CAR_LENGTH sensor 100. This partial listing shows how a list of controller inputs and outputs is assembled from the graph of the ENTRY part of the PROCESS.

FIG. 17 shows a similar tag list window 128 with a list of tags for the WASH part of the PROCESS. The tag CAR_DETECT_2.CAR_DETECT identifies a 120-volt AC input signal to a controller from the CAR_DETECT_2 sensor 102 in FIG. 8. The SPRAY_PUMP motor 104 receives a 120-volt AC discrete output signal from a controller (Tag SPRAY_PUMP. WATER_PUMP_MOTOR in FIG. 17). The sensor 103 labeled "LEVEL" in FIG. 8 sends a 120-volt AC discrete input signal to be sensed by a controller (Tag LEVEL.SOAP_WATER_LEVEL in FIG. 17). The valve 106 in FIG. 8 is opened through a controller output signal of 120 AC volts (Tag WATER.-

WATER_VALVE in FIG. 17) during the WASH cycle. A signal of 120 AC volts (Tag WATER.VALVE_OPEN) is received at an input to the controller from an output on the water valve 106 to sense when it is open.

FIG. 18 shows a similar tag list window 129 with a list of tags for the WAX part of the PROCESS seen in FIG. 9. The CAR_DETECT_3 sensor 111 provides a 120-volt AC discrete input (IN) signal (CAR_DETECT_3.CAR_DETECT). The WAX_1_OPEN signal and the WAX_2_OPEN output signal are 120-volt AC discrete input signals for sensing the position of the valves 116, 117. The WAX_1_VALVE signal is an output signal to control the opening of the WAX_1 valve 116. The M_1 motor 112 provides two input signals, an AUX_CONTACT signal and a OVER_TEMP signal, both of which are 120-volt AC discrete input signals. The motor 112 is operated in response to a 120-volt AC discrete output signal referred to as M_1.WAX_SPRAY_PUMP in the tag list 129. The last tag in the "WAX" cycle tag list is the name for a 120-volt discrete AC input signal WAX_FLOW from the sensor 118 labeled WAX_SPRAY. As with the other tag lists, this is a partial list to show how a list of controller input and output signals is assembled from the graph of a part of the process.

Once the car wash process has been graphed and its electrical inputs and outputs are defined, the user is ready to activate the HARDWARE graphical editing task by selecting that choice from the selection bar 42 using the mouse 17.

c) Description of the HARDWARE Editing task

Referring to FIG. 20, the highest level graph of the HARDWARE editing task is activated in the graph editing window 33 by selecting the HARDWARE selection area 84 in the selection bar 42 using the mouse 17. This graph includes nodes 131, 132 which are created for the ENTRY location and the EXIT location in the car wash. This is accomplished by selecting the "NEW" tool 133c from the LOCATIONS panel 133a of a palette 133 for the HARDWARE editing task and by naming the new nodes. When this graph is viewed on the screen, the hardware system node labeled "CAR-WASH" in the tree graph 134 appears in a shaded box represented by dashed line 234.

Figure 21:
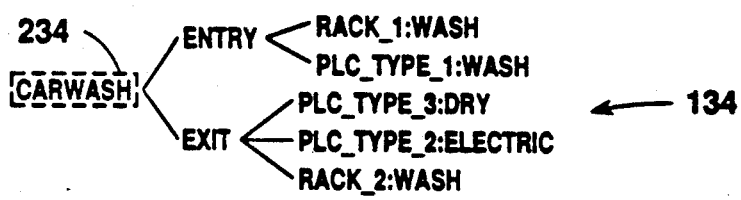

As seen in FIGS. 20 and 21, a tree graph 134 is formed for the HARDWARE editing task to graphically show the hierarchical relationship of graphs or diagrams of the controller hardware. FIG. 21 is viewed on the screen by clicking on the tree graph window 43 and by selecting "zoom" from the menu as discussed for the PROCESS editing task.

Within the ENTRY and EXIT nodes 131, 132 of the HARDWARE editing task are graphs of programmable controller hardware that are used to diagram a system for controlling the equipment in the car wash. As seen in FIG. 22, which is a graph for hardware at the ENTRY location, the processor chassis 21 in FIG. 1 is represented by a processor chassis node 135. This node is added using a processor tool 136 in a PROCESSOR palette panel 133b. The choice of one of the processor tools 136 defines the type of processor that is added, in this case PLC_TYPE_1. The processor is given an alphanumeric processor name such as "WASH".

When the graph of the ENTRY node is displayed in the editing window 33 in FIG. 22, the ENTRY node in the tree graph 134 appears in a shaded box represented by dashed line 235. When the graph of the EXIT node is displayed in the editing window 33 in FIGS. 23 and 24, the EXIT node in the tree graph 134 appears in a shaded box represented by dashed line 236.

The processor nodes 140, 141 are added in the graph of the EXIT location in FIGS. 23 and 24 to represent the other two programmable controllers 31 and 32 seen in FIG. 1. One of these is added with the PLC_TYPE_2 tool, and the other is added with the PLC_TYPE_3 tool. The PLC_TYPE_2 processor chassis 140 is given the name, ELECTRIC, and the PLC_TYPE_3 processor chassis 141 is given the name, DRY. The three nodes 140, 141 and 142 in FIGS. 23 and 24 are also represented as nodes in the tree graph 134.

As seen in FIG. 24, the palette panel 133b also has a tool 138 for adding I/O chassis nodes 142, such as I/O chassis 22b at the EXIT location in FIG. 1. Only one type of I/O chassis is provided by the single I/O chassis tool 138, but other types of I/O units could be provided with additional tools. When the I/O chassis tool 138 is selected, a menu 143 pops open, as seen in FIG. 24, so that the user can assign the I/O rack to a processor listed in the menu 143. In this instance, an I/O rack at the EXIT location is assigned to a processor named "WASH" at the ENTRY location. The node 142 for the I/O rack then appears, as seen in FIGS. 23 and 24, with the lowest available rack identification number, such as RACK_2, for that processor. The I/O rack is connected to the "WASH" processor by the single available serial communication channel, which is identified on the I/O node 142 as "CHANNEL 1".

Once the controller processor chassis and I/O chassis have been selected and assigned to locations, a graph or icon can be called up for these objects to assist in determining what specific I/O modules are needed to handle the functional electrical signals previously identified for the car wash process during activation of the PROCESS editing task.

Figure 25:
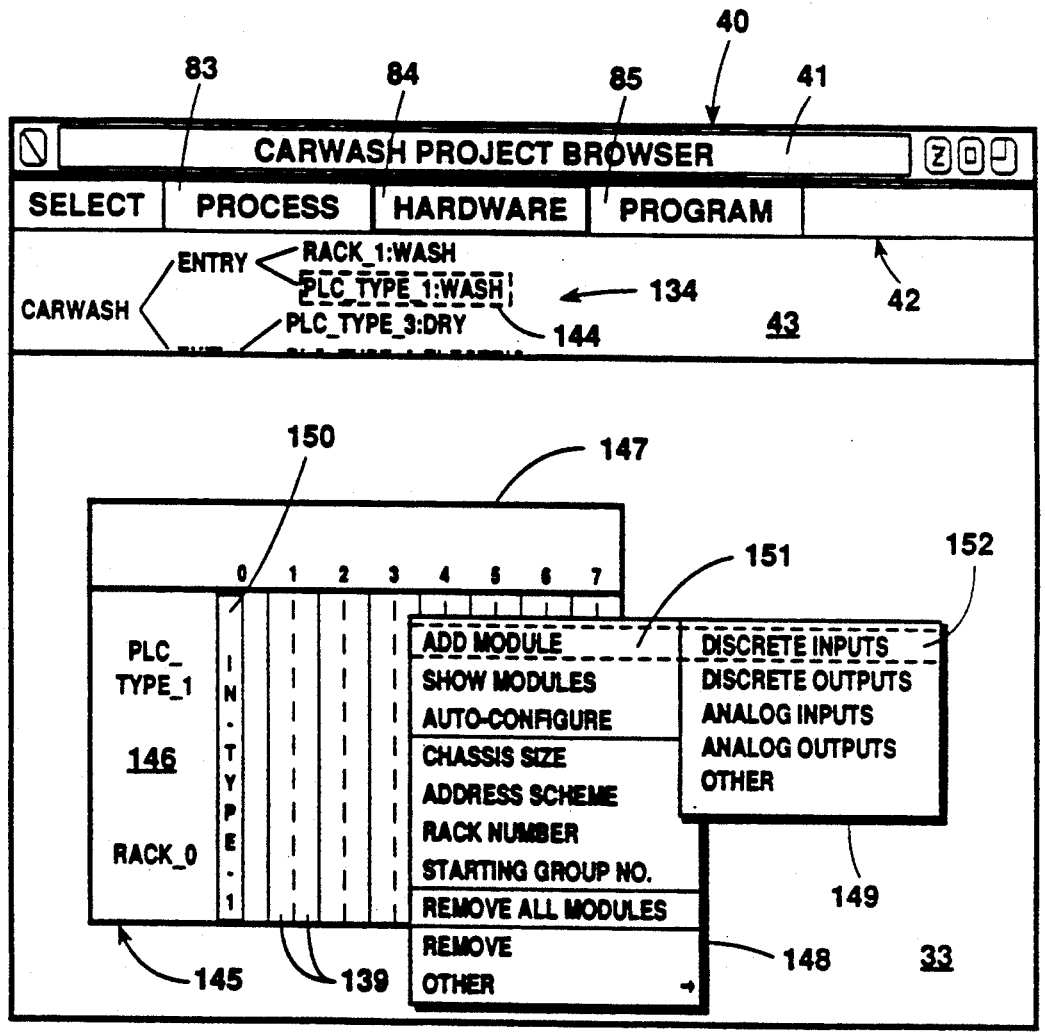

As seen in FIG. 25, the selection of the PLC_TYPE_1 processor node, by clicking on a branch of the tree graph 50, as represented by dashed line box 144 in FIG. 25, calls up an image 145 of a physical processor chassis. This image 145 includes the PLC_TYPE_1 processor 146 shown in a left-most slot and eight pairs of physical slots 139. Each pair of slots 139 will hold at least a pair of 8-bit, discrete I/O point modules, which are known as a module group and which are numbered "0" to "7" (octal). The maximum number of I/O modules for any processor or I/O chassis is sixteen, and chassis for four, eight and twelve I/O modules are also available.

The processor chassis image 145 is selected by moving the mouse-controlled cursor over it. This selects the object 145 as shown by the display of a heavy line 147 that encloses the module group addresses."0" to "7". By operating the RHB of the mouse, two menus 148 and 149 are presented as seen in FIG. 25 for adding I/O modules 150 both visually and in a data sense to the selected chassis.

Figure 26:
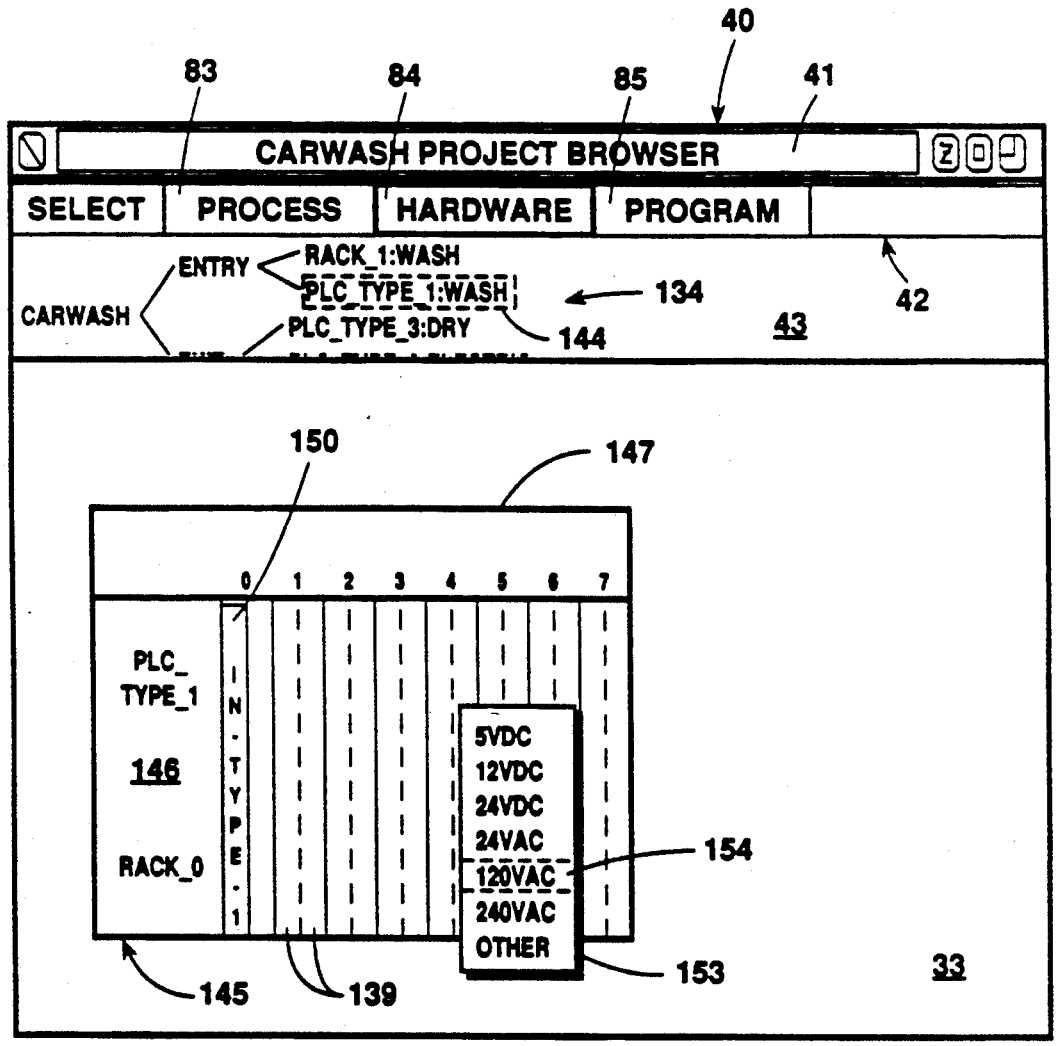

The first command 151 on the first menu 148 adds an I/O module 150 in the first slot, which is Rack 0, Module Group 0, Module 0 (left slot) in this example. The address of the starting Rack and starting Module Group No. for the first slot can be changed with selections in the menu 148. The first I/O module to be added visually will be added to the I/O slot with lowest available slot address and furthest to the left. As the "ADD MODULE" command 151 is executed, the module 150 can be designated to handle discrete or analog inputs and outputs from the second menu 149, In this example, we shall assume the "DISCRETE INPUTS" command 152 is executed. When the module 150 has been designated input or output, the first two menus 148, 149 close and a third menu 153 appears, as seen in FIG. 26 to provide options for signal level ranging from 5 DC volts to 240 AC volts. In this example, the 120 VAC command 154 is selected by positioning the cursor on it and clicking on it with the mouse LHB.

Figure 27:
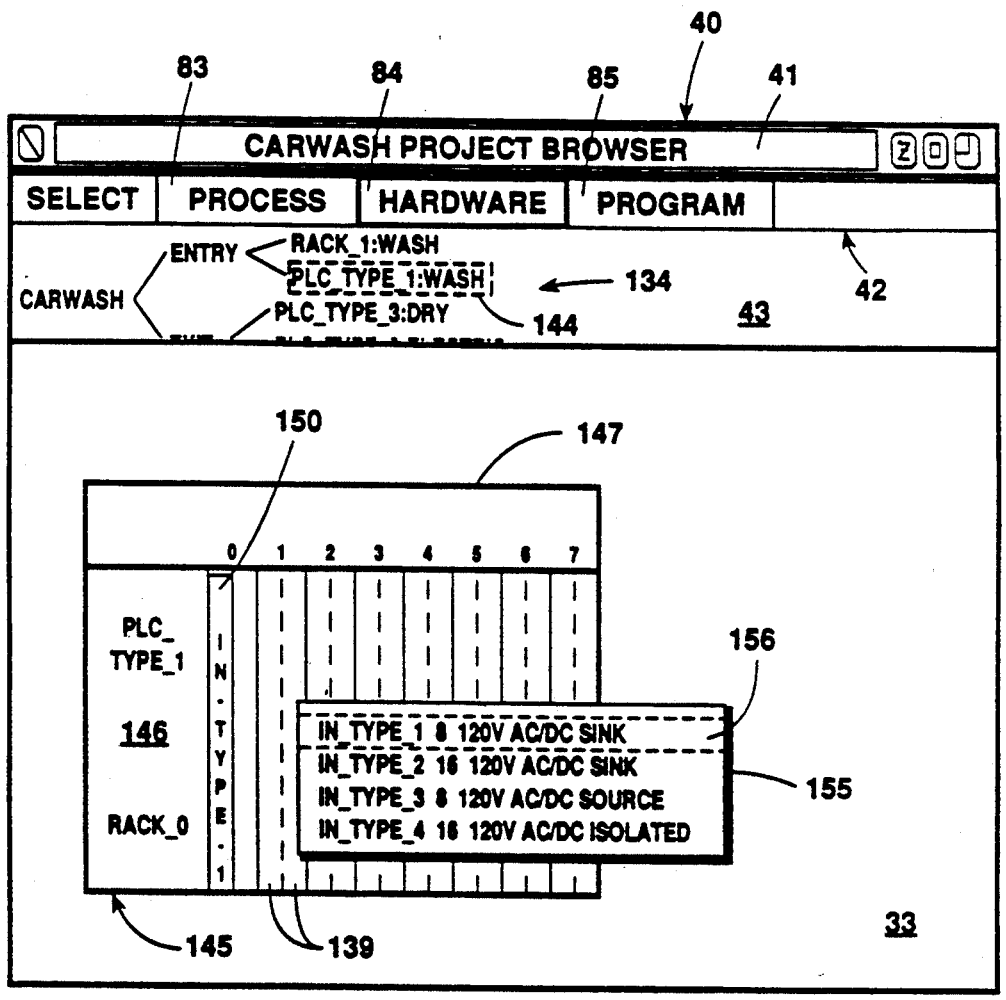
Figure 28:
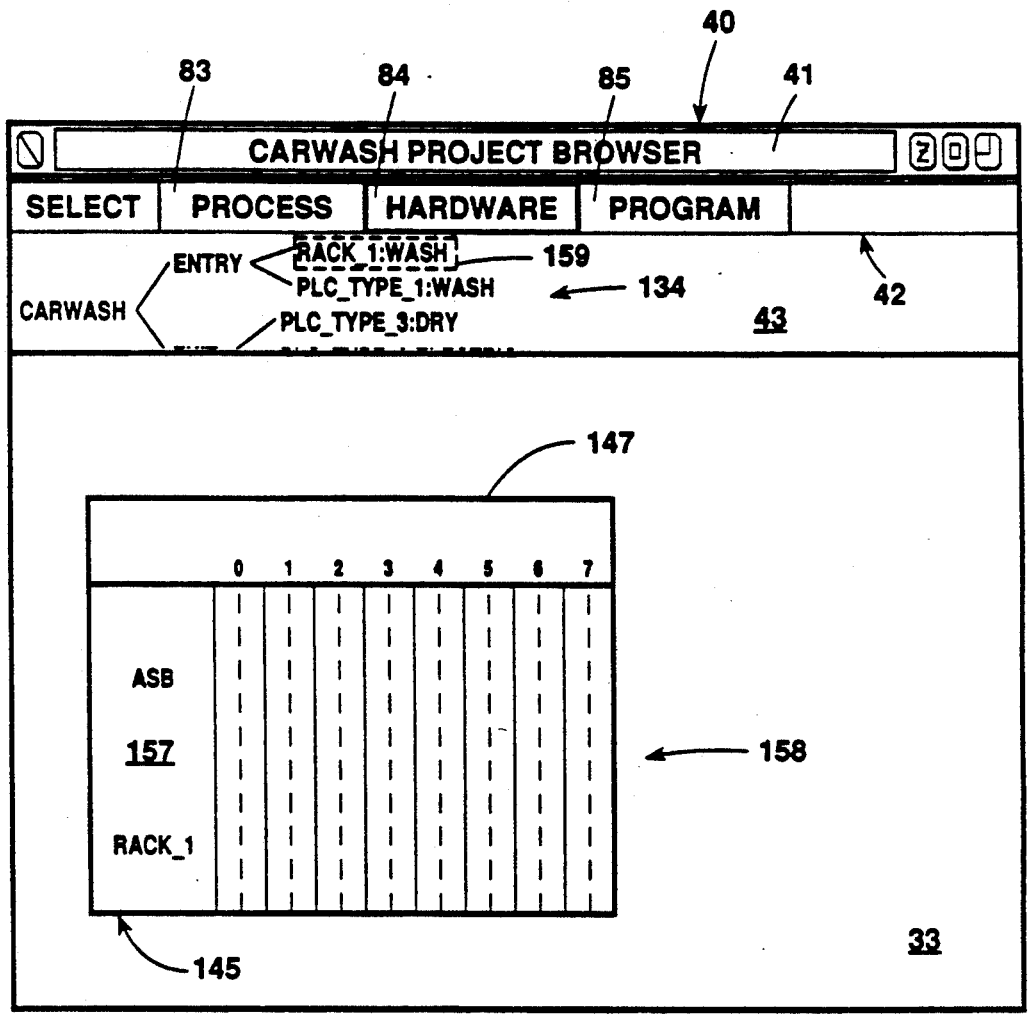
Figure 29:
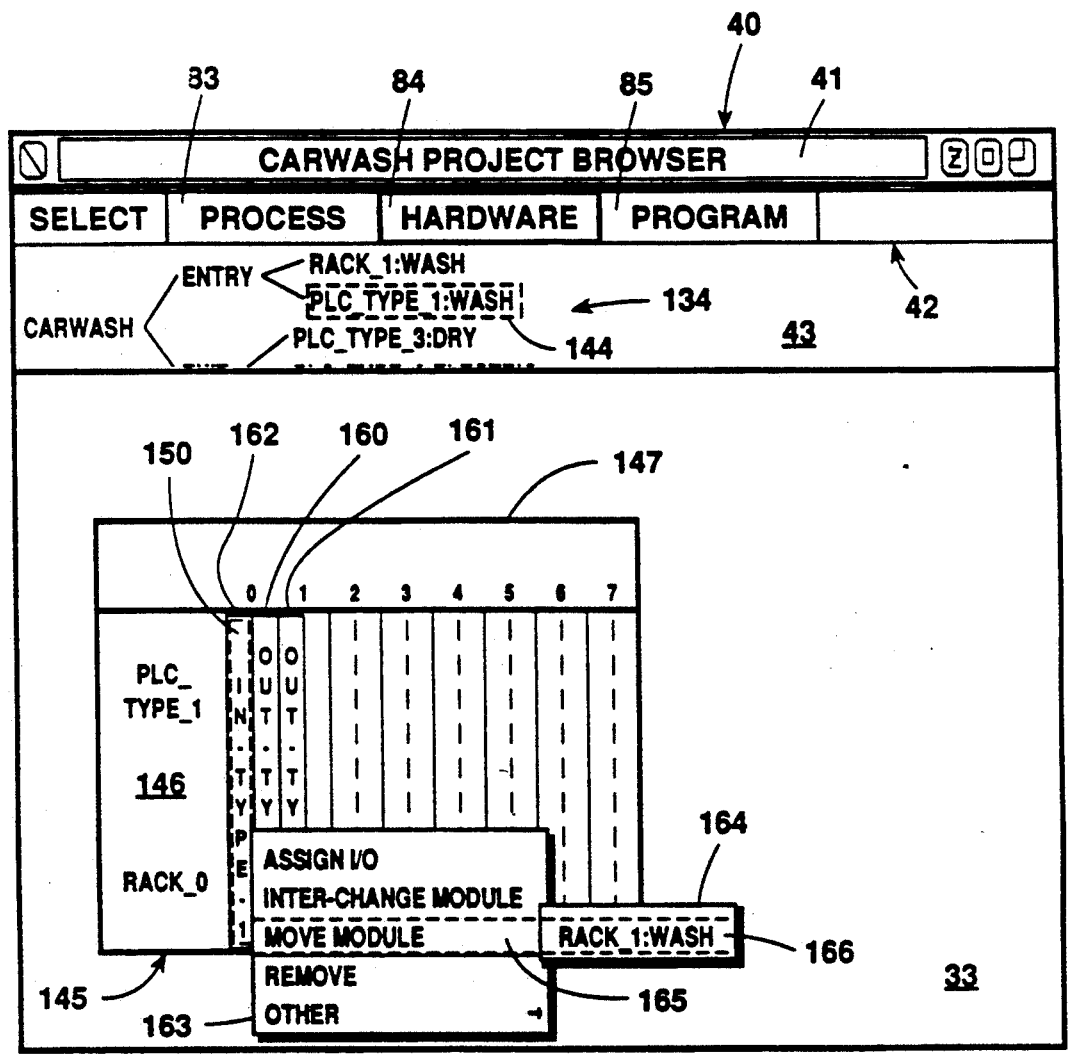

Once an I/O module 150 is defined as to input or output and signal level, a fourth menu 155 opens as seen on FIG. 27 to provide the available types of I/O modules meeting these parameters. As seen in FIG. 27 there are four choices depending on numbers of I/O points or bits of I/O capacity and a further choice as to type of input or output, such as source or sinking or isolated. In this case, the first command 156 is selected and executed to designate an IN_TYPE_1 module for the first available slot in the processor chassis 145. An image of the input module 150 is superimposed at the correct slot location to simulate insertion of an I/O module 150 into the chassis 145. FIG. 28 shows an image 158 for the RACK_1 I/O chassis from FIG. 22. This image 158 appears when the RACK_1:WASH node is selected in the tree graph 134, as represented by dashed line box 159 in FIG. 28. This image is similar to the processor chassis image 145, except that an adapter module 157 labeled "ASB" is placed in the left-most slot instead of the PLC_TYPE_1 processor. I/O modules would be added to the I/O chassis image 158 in the manner described for the processor chassis image 145, using the four menus 148, 149, 153 and 155 described above. After adding I/O modules 150, 160, 161 to a processor chassis 145 or an I/O chassis 158, as seen in FIG. 29, a module such as the input module 150 can be selected by moving a cursor over it and operating the LHB of the mouse 17. On a color monitor, if the processor chassis image 145 is white or light, the selection of an I/O module image 150 changes its color from white (light) to red (dark) as represented by a dashed line selection box 162 in FIG. 29.

When the I/O module 150 is selected, menus 163, 164 can be opened by pressing the RHB of the mouse 17. A "MOVE MODULE" command may be selected and executed to move the I/O module to a different rack or slot. The second menu 164 provides a list of other chassis to which the module 150 can be moved. In this example, the input module 150 is being moved from the processor chassis RACK_0 to the I/O chassis labeled RACK_1:WASH by executing command 165 and making selection 166 from the second menu 164 as seen in FIG. 29. When an I/O module 150 is selected, it can also be dragged from slot to slot within its I/O chassis.

Figure 30:
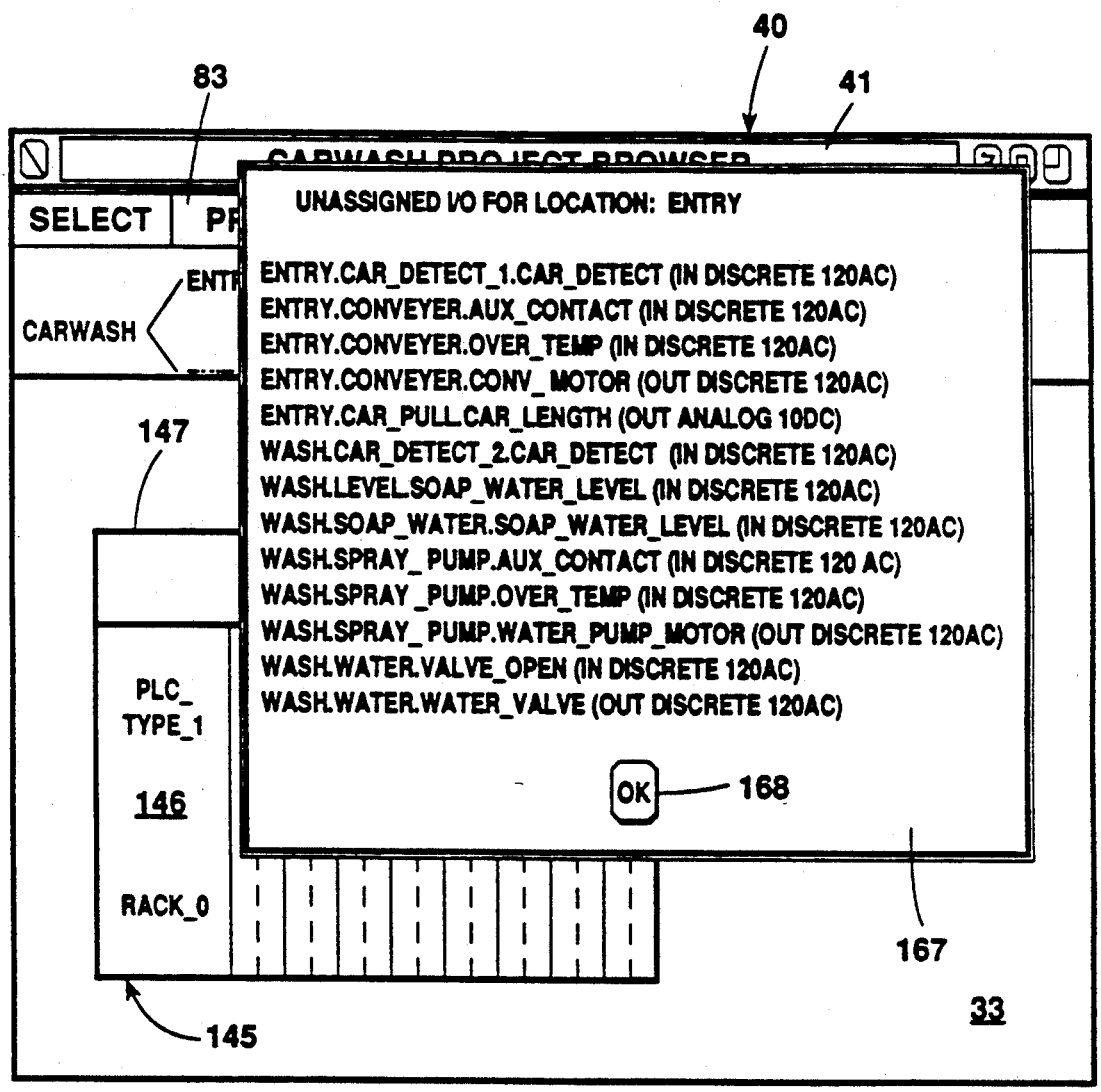

As seen in FIG. 30, by clicking in an open area of the editing window 33 and outside the image of the processor chassis 145, and by clicking with the RHB of the mouse 17, a menu is opened with two choices: 1) unassigned I/O at this location and 2) I/O unassigned to any location. Assuming the first option is selected, a list 167 for the ENTRY location is displayed as seen in FIG. 30. This is a list of the process input signals and output signals that were defined in the tag lists for the ENTRY and WASH cycles shown in FIGS. 16 and 17, but were not assigned to an hardware input or output. This list is for informational purposes to help the user choose the type of I/O modules in the HARDWARE editing task that are needed to handle these functional signals developed in the PROCESS editing task.

As seen in FIG. 30, the unassigned process I/O signals have tag names in the form of [process node name.equipment node name.process I/O signal name (I/O signal type)]. The list 167 is limited to signals that *have not* been assigned to a hardware input or output on an I/O module 150. This is a reference list. By clicking on the OK area 168 the list is removed from display.

Figure 31:
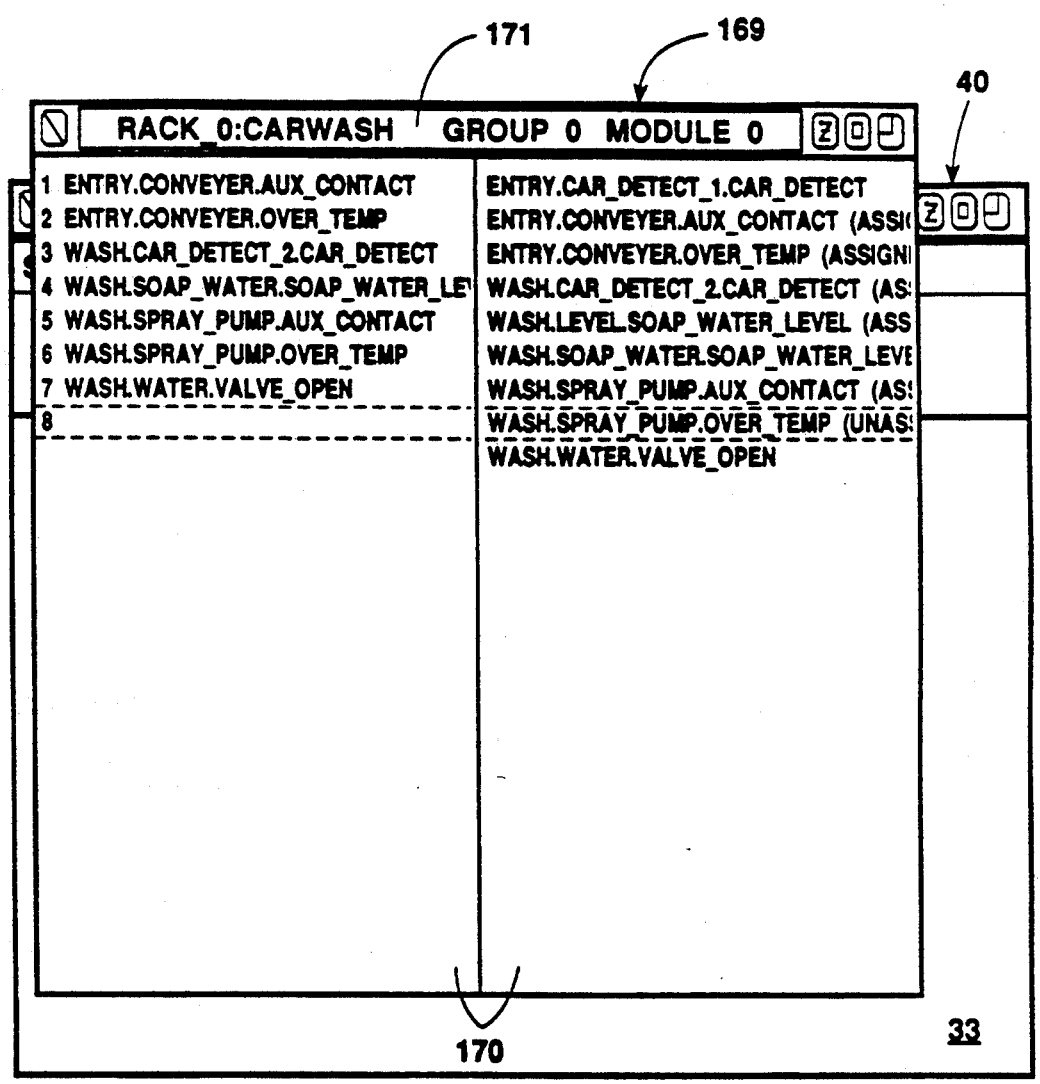

FIGS. 29 and 31 illustrate how the process I/O signals are related to inputs and outputs on the controller hardware which have been selected in the preceding Figures. As seen in FIG. 29, the menu 163 includes an "ASSIGN I/O" command for assigning functional process input signals and output signals from the PROCESS editing task to the I/O modules. When this command is selected, by moving the mouse-controlled cursor over it and operating the LHB on the mouse 17, an I/O assignment window 169 is opened as seen in FIG. 31.

The assignment window 169 displays a two-column list 170 under a header 171 that displays Rack 0, Group 0, Module 0. This is a list 170 of assigned and unassigned I/O for ENTRY and WASH parts of the car wash process, because the processor chassis 147 in FIG. 29 is located at the ENTRY location to handle these two parts of the process.

The identification of the Rack 0, Module Group 0, I/O Module 0 in the header 171 and individual inputs and outputs "1" to "8" in the left column provides the system I/O addresses for inputs and outputs for the controller hardware This address also identifies the I/O module selected in FIGS. 25-27. In the right column in FIG. 31 are unassigned PROCESS input and output signals in the form [process node name.equipment node name.process I/O signal name (I/O signal type)]. When one signals is assigned, its tag is followed by the note "(ASSIGNED)".

An example of assignment of a process I/O signal to a controller input and output is seen in FIG. 31, where an unassigned one-bit input location "8" in the left column is selected with the mouse and highlighted. Next, the unassigned input signal WASH.SPRAY_PUMP-.OVER_TEMP in the right column is selected and highlighted, and it will also appear in the left column at the selected location. Once assigned, a notation "(ASSIGNED)" appears in the right column.

When input and output signals from the PROCESS editing task are assigned they become associated with the inputs and outputs on the controller hardware, which take on the signal names. The process signals also become linked to the system I/O addresses. As seen from this description the HARDWARE editing task provides a convenient graphical method to relate the process to the controller hardware needed for the control system, and particularly, the hardware inputs and outputs at which the controller is connected to the process. This not only helps the user in choosing and setting up controller equipment, but it also provides further information that is helpful in programming the processors in the controller equipment.

d) Description of the PROGRAM Editing Task

After the controller hardware has been defined for the car wash process, the user is ready to operate in the PROGRAM graphical editing task to write high-level graphical programs for the controller processors. Various types of graphical programming languages can be used in the PROGRAM editing task. Three types chosen for this application are ladder diagram programming, sequential function chart (SFC) programming, and function block diagram (FBD) programming.

To enter the PROGRAM editing task, the user clicks on selection area 85 in the selection bar 42 using the LHB of the mouse 17.

Figure 32:
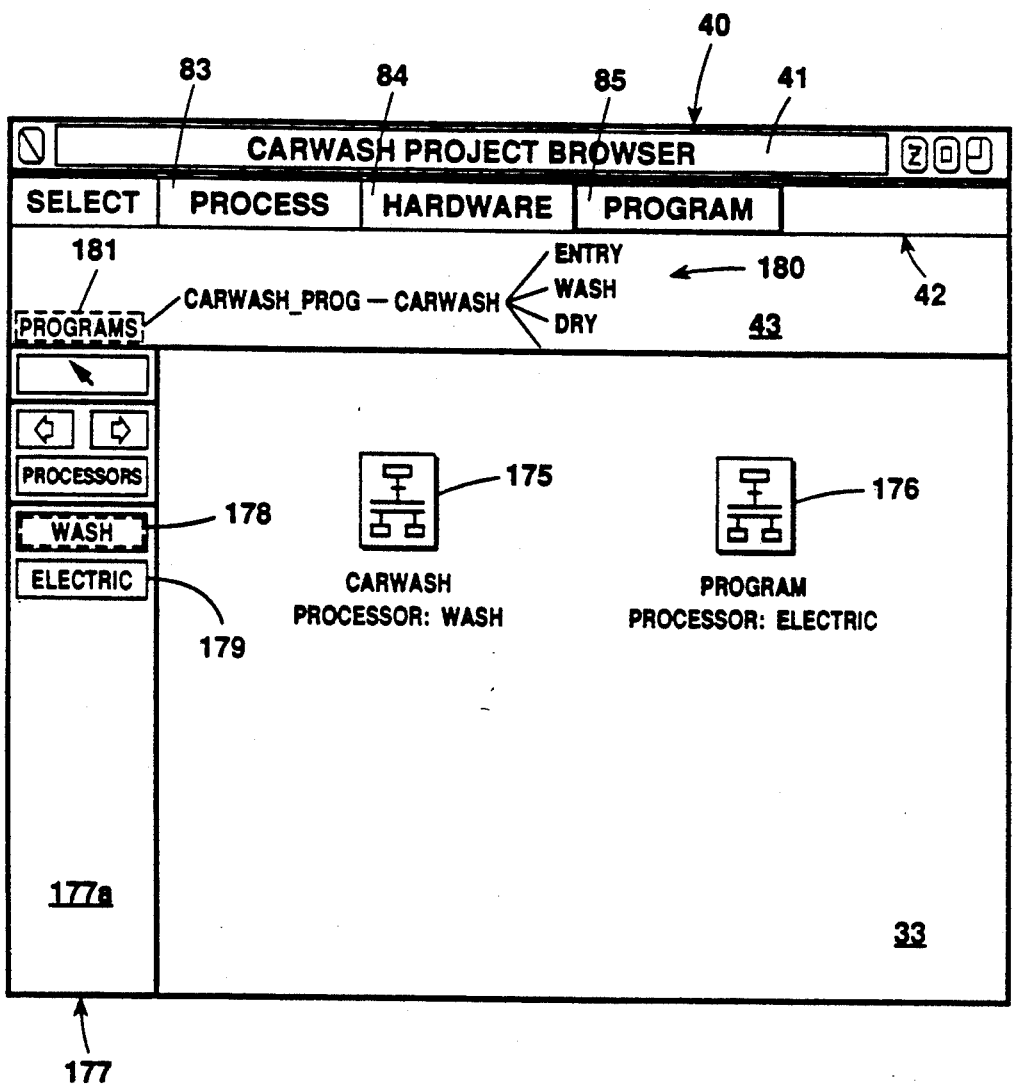

FIG. 32 shows the "PROGRAMS DOCUMENTS" graph discussed earlier in relation to block 63 in FIG. 3b. This particular example of the graph shows two icons 175, 176 in the editing window 33. These icons 175, 176 are of the type for representing sequential function chart (SFC) programs. The first program 175 is named "CARWASH" and is intended to run on the processor named "WASH" at the ENTRY location. The other program 176 is named "PROGRAM" and is intended to run on a processor named "ELECTRIC" at the EXIT location. The palette panel 177a seen in FIG. 32 has tools 178, 179 for assigning programs to these two controller processors 23, 31 in FIG. 1. Other tools would be available on the panel 177a to assign programs to various controller processors seen in FIG. 1.

FIG. 33 shows a second panel 177b in the revolving palette 177, with a "NEW" tool 182 for adding new types of programs for the processors. The "GRAVEL" tool 183 commands uploading a program from the hard disk 15 to internal RAM memory in the computer 13.

Figure 34:
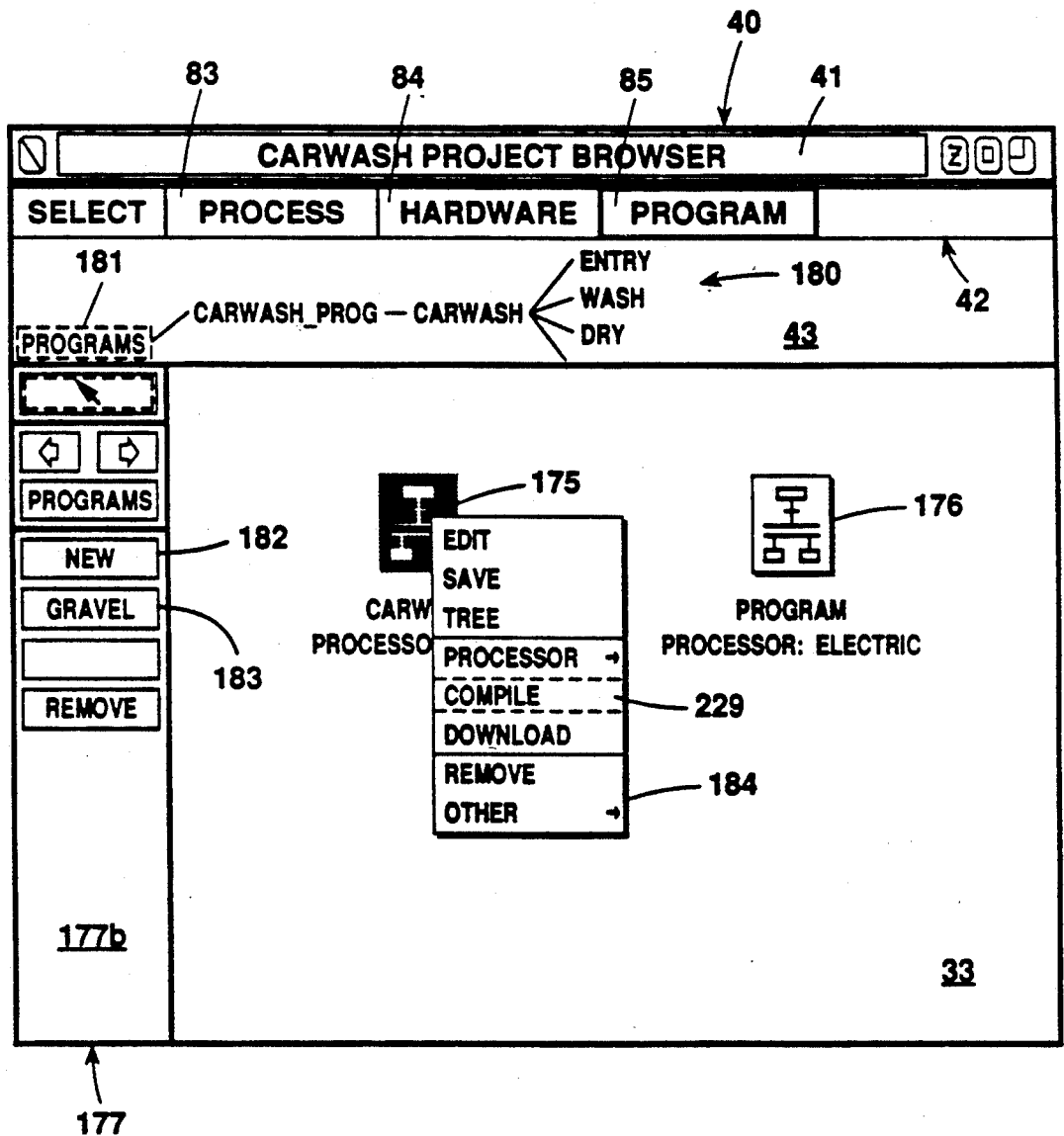

As in the other editing tasks, the creation of nodes results in a tree graph 180 showing the hierarchy of graphs in the PROGRAM editing task. FIG. 34 shows the selection of PROGRAM DOCUMENTS graph represented by the dashed line box 181 around the tree node labeled "PROGRAMS". The CARWASH program 175 is represented by the tree node labeled "CARWASH_PROG".

FIG. 34 also illustrates the selection of one of the programs, the CARWASH program 175 and the opening of a menu 184 related to such a program using the RHB of the mouse 17. This menu 184 provides commands including "PROCESSOR" as an alternative way to assign a program to a specific controller processor. Selection of this command will open another menu (not shown) with a list of controller processors. Another command is "COMPILE" for compiling the program in the executable code file 11 seen in FIG. 1 or into a ladder instruction file in the case of a ladder diagram program. Another command is "DOWNLOAD" for downloading the executable code file 11 or ladder instruction file to a controller processor.

Figure 35:
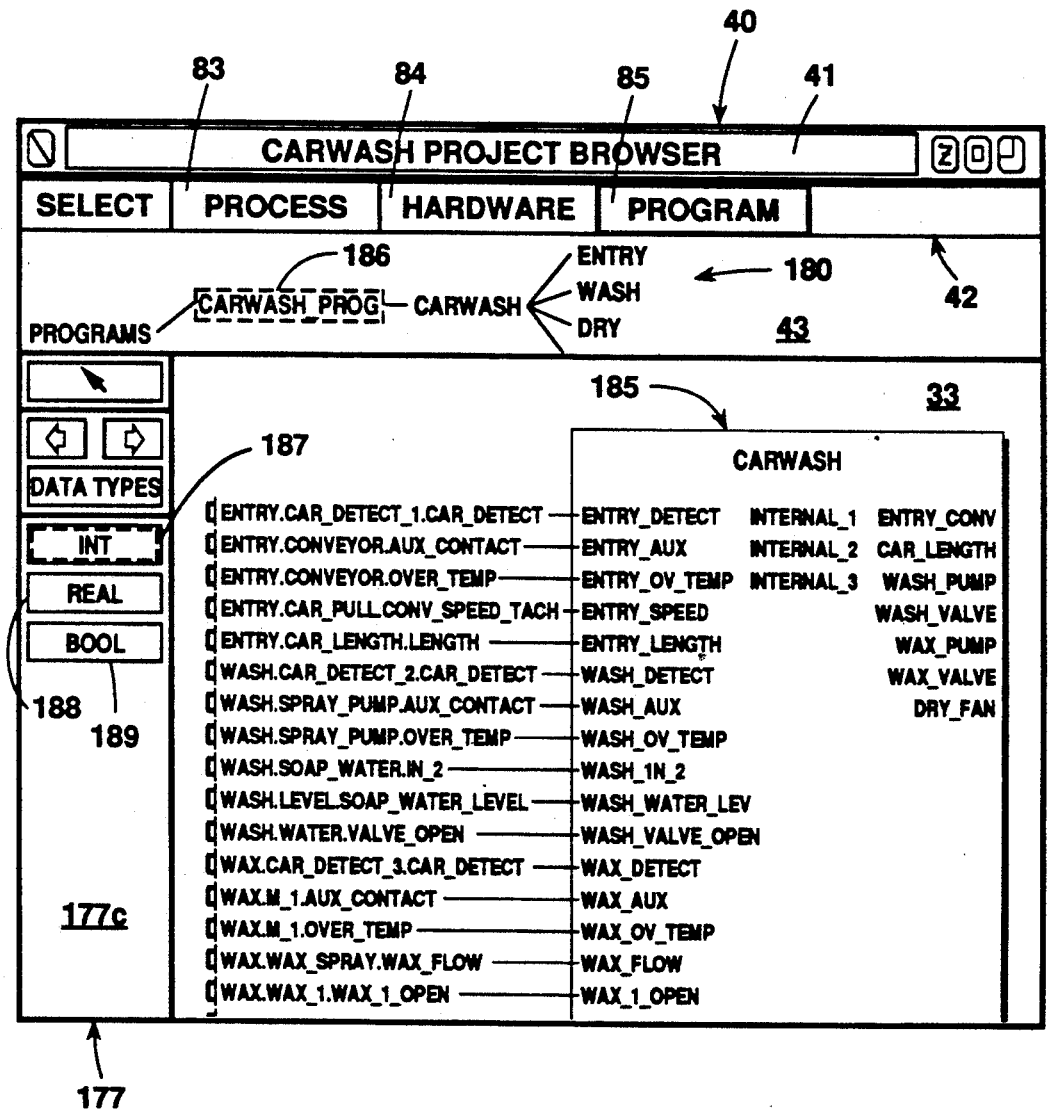

Regardless of the type of graphical programming language, the car wash application provides the capability of representing each program as a single function block diagram (FBD) and single function block element, discussed earlier in relation to blocks 75 and 76 in FIG. 4. This FBD graph is opened in the editing window 33 by selecting the CARWASH_PROG tree node in the tree graph 180 as represented by dashed line box 186 in FIG. 35, As seen in FIG. 35, the program entitled "CARWASH" is represented as one block 185. The full view of the single FBD graph is seen in FIG. 36 by selecting the zoom command for the graph editing window 33 in FIG. 35. The palette panel 177c entitled "DATA TYPES" in FIG. 35 is one of the palette panels available for this graph in the PROGRAM editing task. This palette panel 177c has an INTEGER tool 187, a real number (REAL) tool 188, and a Boolean (BOOL) tool 189 for defining the type of input or output variables used as inputs and outputs to the function block 185.

As seen in FIG. 36, the inputs for the function block 185 (e.g., ENTRY_DETECT, ENTRY_AUX) are displayed on the left hand side of the block 185 and the outputs (e.g. ENTRY_CONV, CAR_LENGTH) are displayed on the right hand side of the block 185. The items with text outside and to the left of the program function block 185 are process input signals that were previously connected to hardware inputs. Process output signals that were previously connected to hardware outputs would be shown as items with text outside and to the right of the program function block 185.

During activation of the PROGRAM editing task, the process and hardware inputs and outputs are visually connected by their tag names to input and output variables in the controller program. When the program is compiled, the program variables are linked to hardware inputs and outputs at their system I/O addresses.

When a function block is added to a graph, it is provided with a set of generic inputs and outputs labeled IN 1, IN 2, etc. These are renamed with test editing operations to specify names for program variables such as ENTRY_DETECT and ENTRY_AUX. These program variables are also defined as to the type of data which is received or transmitted by each input or output variable, using the palette panel 177c with tools for data types such as REAL, INTEGER or BOOLEAN.

Figure 37:
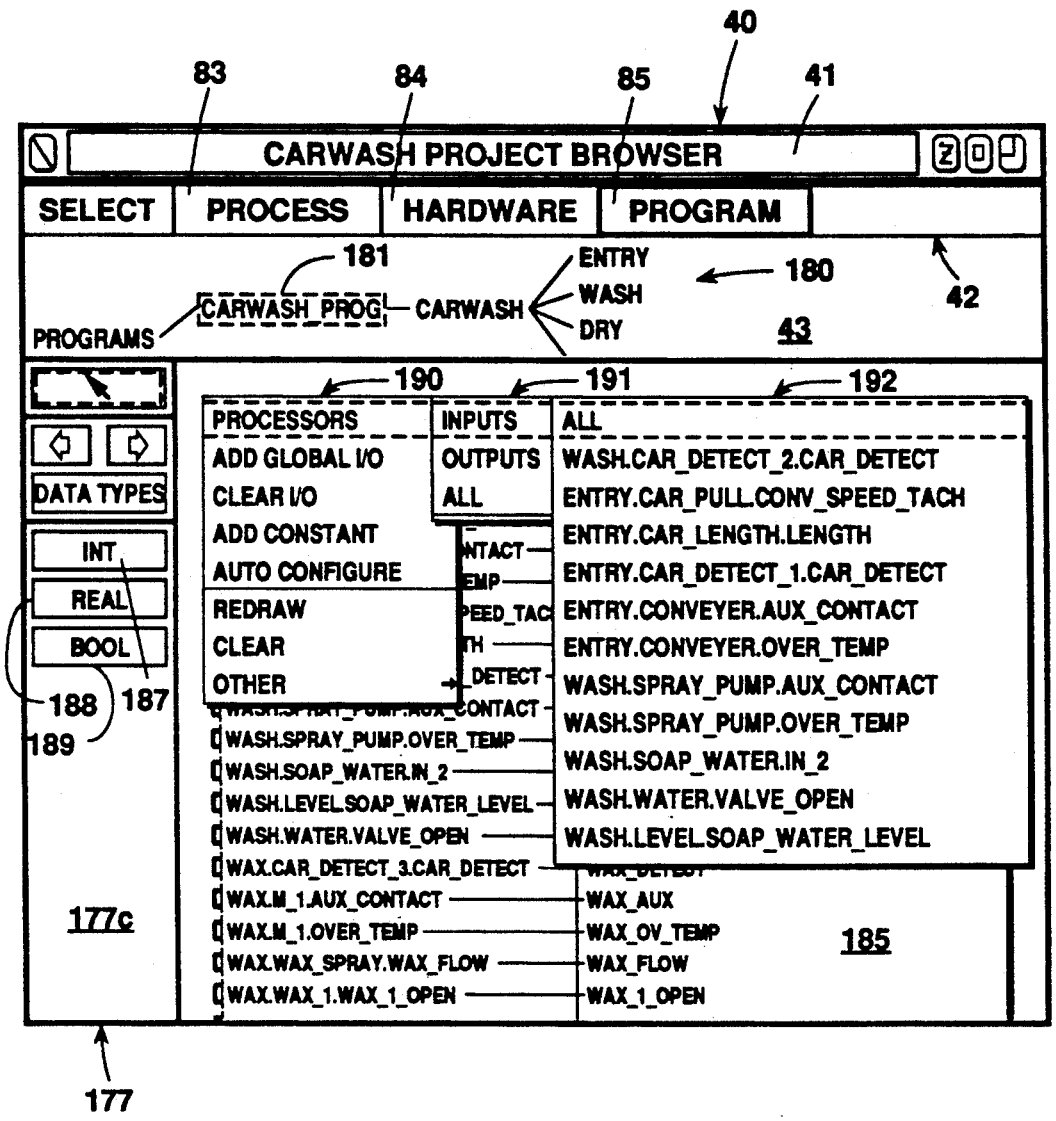

As seen in FIG. 37, a set of three menus 190, 191 and 192 is then opened to add hardware inputs and outputs from a list of tag names received from the HARDWARE editing task. FIG. 37 illustrates the list for all of the inputs for the "WASH" processor. First, "PROCESSORS" is selected from the first menu 190 and then "INPUTS" from the second menu 191, which opens a third menu 191 with a list of tags assigned to the hardware inputs for the applicable processor. By selecting "ALL" from the third menu, all of the input tags on the third menu 191 are added as items with text to the left of the function block 185. Individual input tags could also be selected and added from the third menu 191.

Once the hardware input and output tags have been added to the graph, they can be selected and dragged to a positions opposite input and output variables on the function block 185 using the handles at the left of the text. A hardware input, for example, is visually connected to its opposite input program variable using the mouse technique described earlier for connecting two verts with an arc. The other hardware/process input and output tags are then connected to the program variables by clicking on a program variable, moving the cursor over to a hardware/process I/O point, and clicking again to form an arc, and then moving down the opposing pairs in similar fashion.

Figure 38:
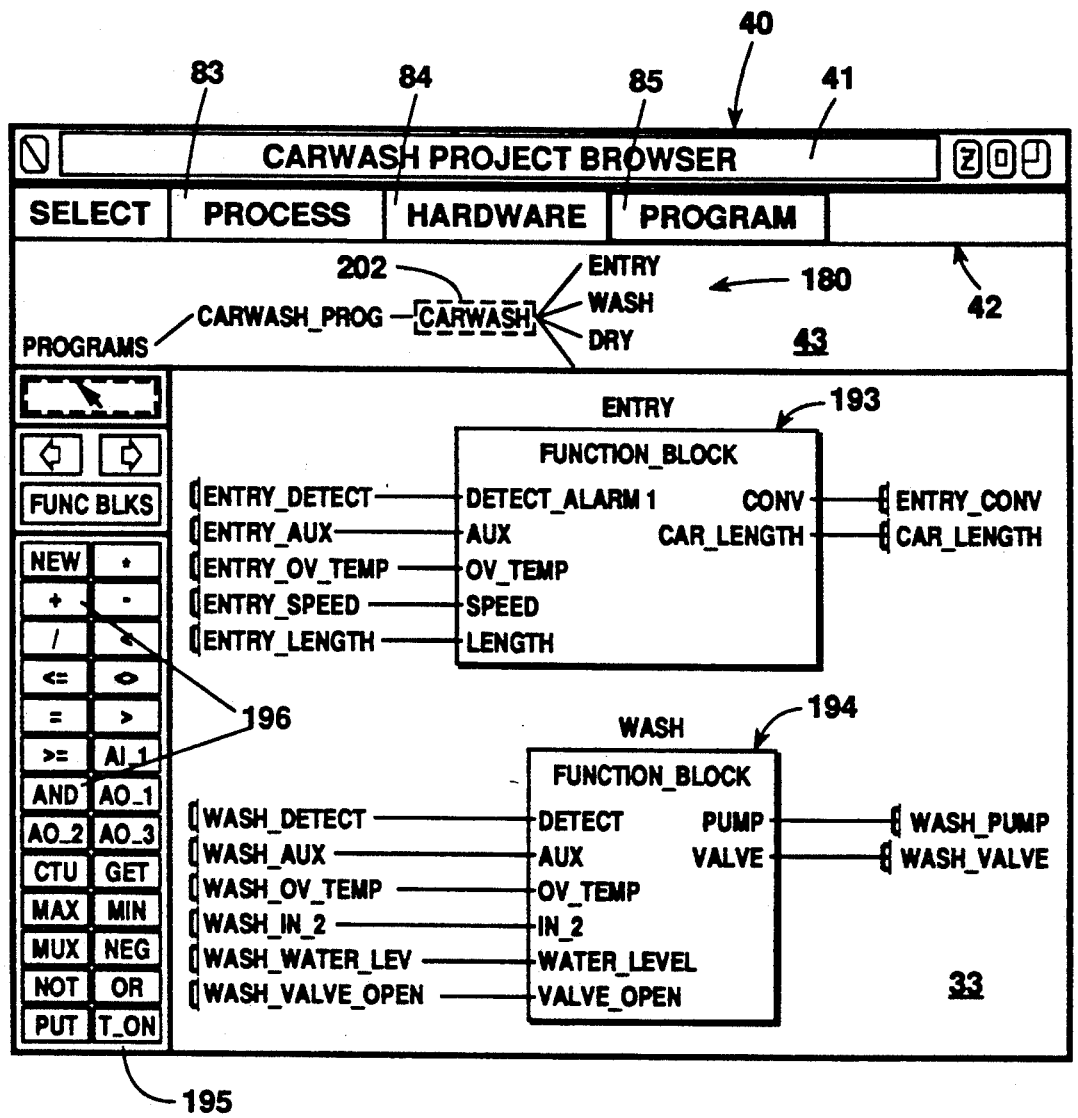

FIG. 38 shows a more detailed diagram in which the CARWASH program is broken down into several function blocks 193 and 194 corresponding to the ENTRY and WASH cycles. A palette panel 195 is provided with tools 196 for adding function blocks having arithmetic functions such as "+" and logical functions such as "AND". Using the "NEW" tool 196, the function blocks can be created for four cycles of the car wash. As seen in the tree graph 180 in FIG. 39, this more detailed diagram of the CARWASH program is selected by selecting the node labeled CARWASH as represented by dashed line box 202.

Input and output variables for these lower level function blocks 193, 194 are named, defined as to data type and then connected to the input and output variables for the higher level function blocks. Data received at the higher level program inputs and outputs can then be passed to and from inputs and outputs at the next lower level of the program.

Figure 39:
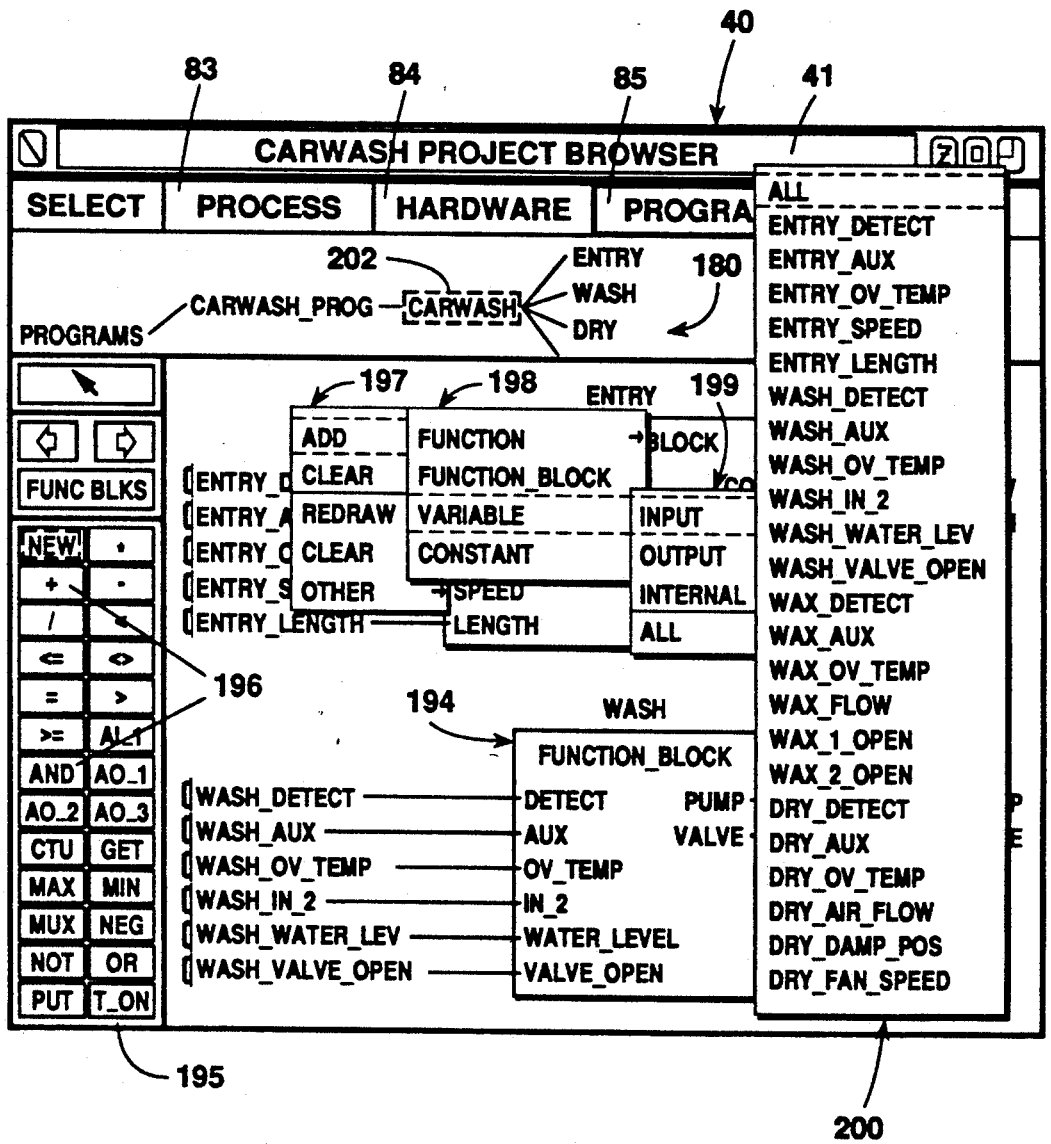

The connection of program variables within different levels of the program is illustrated in FIG. 39, which depicts four menus 197, 198, 199 and 200. To add the inputs from the higher level function block, the command "ADD" is selected from the first menu 197 and the command "VARIABLE" is selected from the second menu, and the command "INPUT" is selected from the third menu 199, which opens the fourth menu 200. The fourth menu 200 includes a list of the program variables from the single function block 185 for the CARWASH program. Again, the command "ALL" is chosen to display all of the inputs in the fourth menu 200 in the editing window 33. These are added as items with text to the left of the function blocks 193, 194 After adding these inputs and output variables they are connected to the newly defined input and output variables for the more detailed function blocks 193, 194 for the CARWASH program 175 in the manner described above for the single function block 185.

Figure 40:
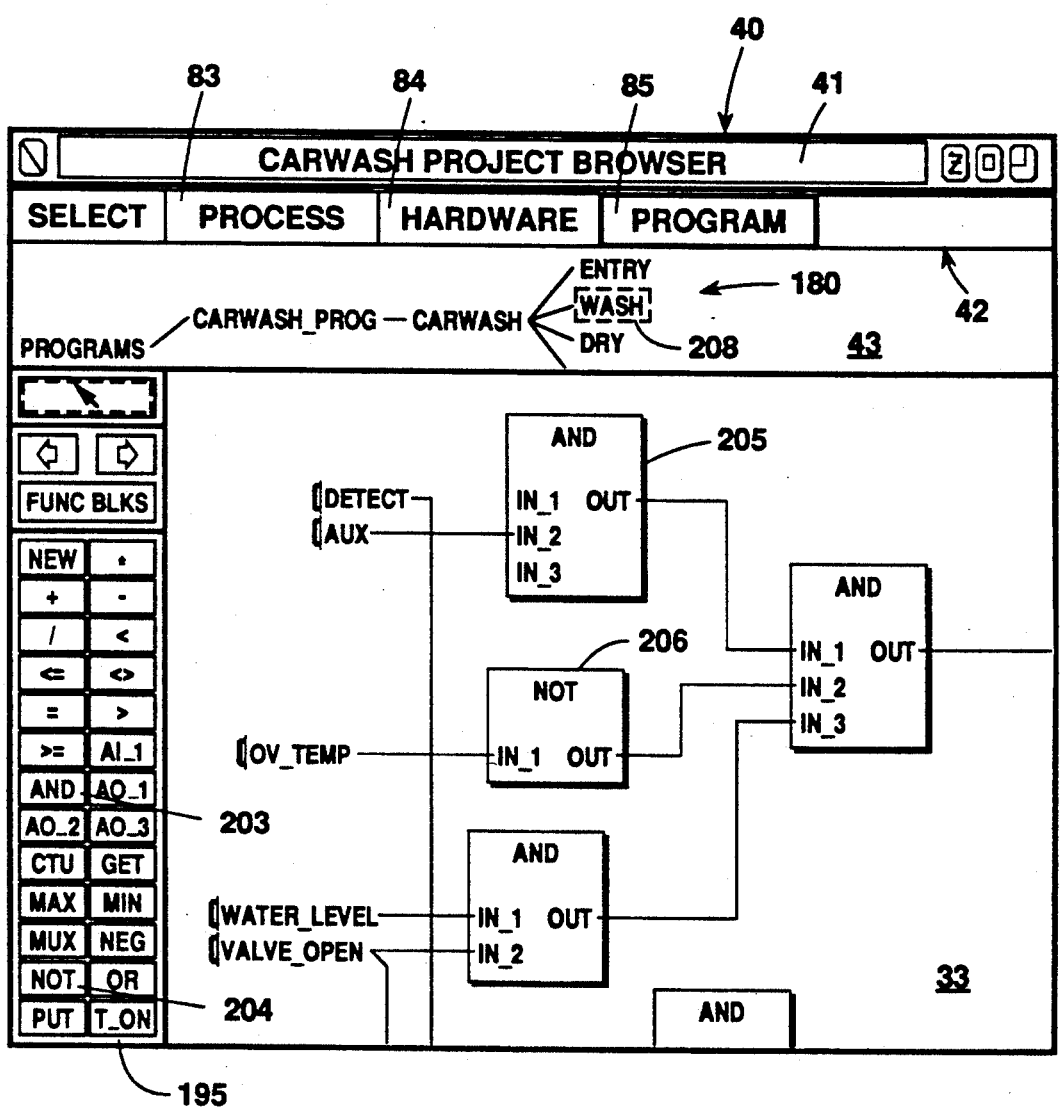

FIG. 40 illustrates that, using the techniques described above, a set of AND and NOT logic blocks with predefined inputs IN_1, IN_2, IN_3 and predefined output OUT can be added and connected to program variables for the WASH function block 194 in FIG. 38. Palette tools 203 and 204 are used to add the "AND" and "NOT" function blocks 205 and 206. Input and output variables are defined as to type (BOOLEAN) for the function blocks 205, 206 and connected to the input and output variables (DETECT, AUX) for the WASH function block 194 as described above for higher levels of the program. This program is displayed by selecting the "WASH" tree node as represented by dashed line box 208.

Figure 41:
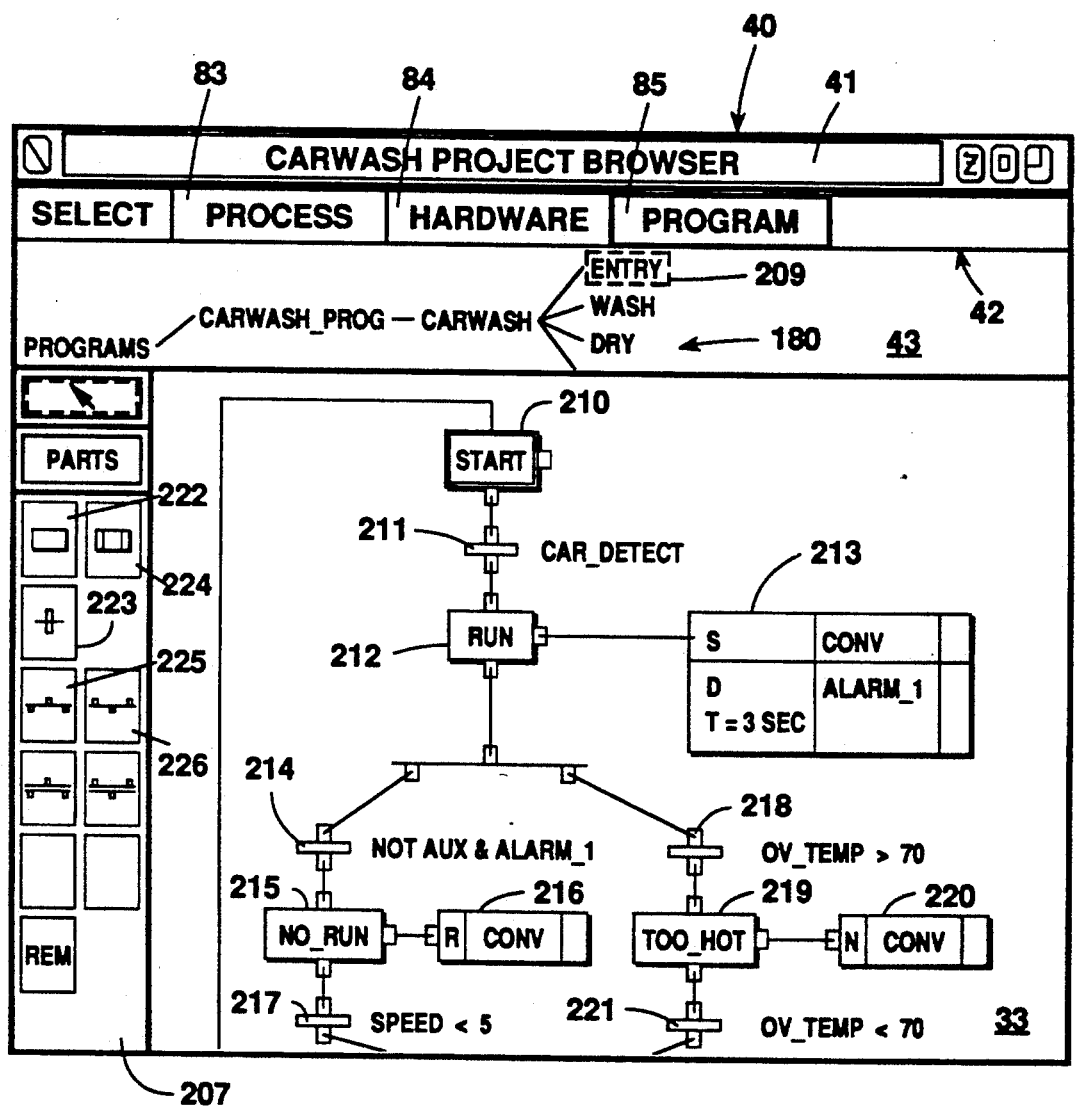

FIG. 41 illustrates a palette panel 207 labeled "PARTS" with graphical symbol tools 222-226 for sequential function block (SFC) programming. This SFC program is encapsulated in the ENTRY function block 193 in FIG. 38, and would be executed by a controller processor at the ENTRY location. This program is displayed by selecting the "ENTRY" tree node as represented by dashed line box 209.

Figure 42:
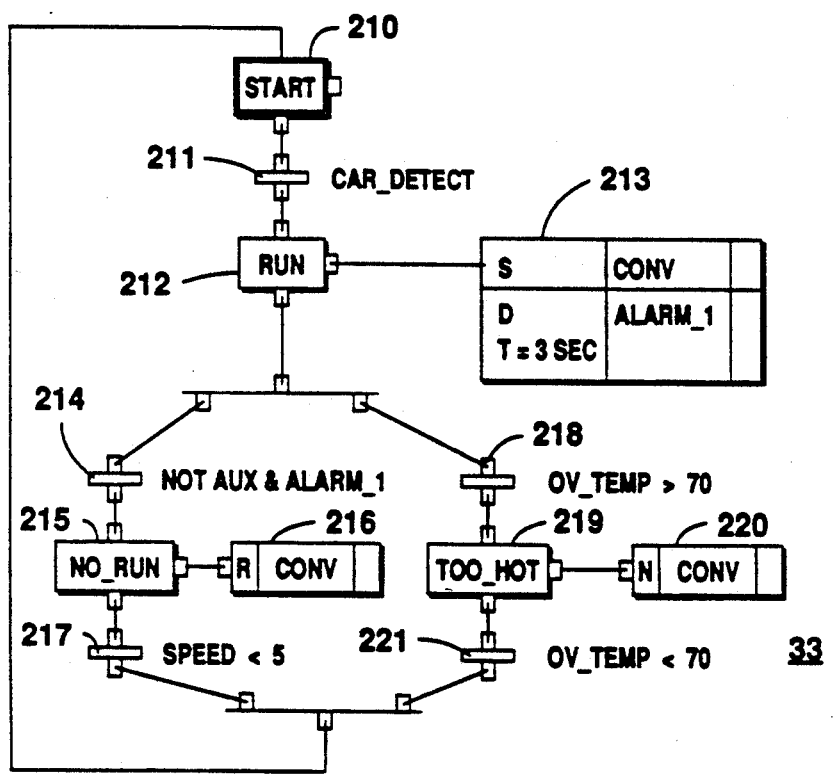

The full SFC program is seen by executing the zoom out command for the editing window 33 in FIG. 41. The zoom out view is seen in FIG. 42. SFC instructions include steps and transitions. Steps are represented graphically by a box with three vertices. The first block 210 in FIG. 42 is an initial step that indicates where execution begins. The initial step is signified by the double line border on the box. The start step is followed by a transition instruction 211. Transition instructions are graphically represented by a horizontal bar with vertices on top and bottom. A transition instruction is executed when the "CAR_DETECT" logical input variable becomes logically "true". The transition instruction 211 is followed by a step instruction 212. It is connected by an arc to an action block 213. The program branches on the next transition either to a right branch or to a left branch.

The left branch has a first transition instruction 214. This branch is entered when the conditions on the transition instruction 214 become logically "true" before the conditions for transition instruction 218 become logically "true". The transition instruction 214 is followed by a step instruction 215, which is connected to an action block 216. This block is followed by another transition instruction 217.

The right branch has a first transition instruction 218. This branch is entered when the conditions on the transition instruction 218 become logically "true" before the conditions for transition instruction 214 become logically "true". The transition instruction 218 is followed by a step instruction 219, which is connected to an action block 220. This block is followed by another transition instruction 221.

The program reads as follows. On startup, represented by step 210, the processor checks the CAR_DETECT variable, as represented by transition 211. This variable becomes true when a CAR_DETECT signal is detected, and execution of the program moves to the next step. In the run step 212, the value of the variable "CONV" is set to "true" and stored as represented by the boxes with "S" and "CONV" in action block 213. Also, in the run step 212, a second action of checking the value of variable "ALARM_1" is started after a 3-second delay represented by the letter "D" for delay and "T=3 SEC" for the period of delay.

The next transition to be executed, and the next branch of the program to be executed, depends upon which transition conditions occur first. If the expression "NOT AUX & ALARM_1" becomes true, then the transition 214 is executed to the NO_RUN step 215. In this step 215, the variable "CONV" is reset (R) as shown in action block 216. The next transition 217, back to the start step 210 of the program, occurs when the SPEED variable is detected to be less than "5" as shown for transition 217.

If the a temperature variable OV_TEMP exceeds "70" before the expression "NOT AUX & ALARM_1" becomes true, the transition instruction 218 is executed to proceed to the TOO_HOT step 219. In this step 219, the variable "CONV" is removed from storage as shown by the letter "N" in action block 220. The next transition 221, back to the start step 210 of the program, occurs when the OV_TEMP variable is detected to be less than "70" as shown for transition 221.

Returning to FIG. 41, it can now be seen that the blocks for steps, action blocks and transitions are added using tools 222, 223 and 224. Also provided on the palette panel are tools 225, 226 for branching and reconverging links.

Figure 43:
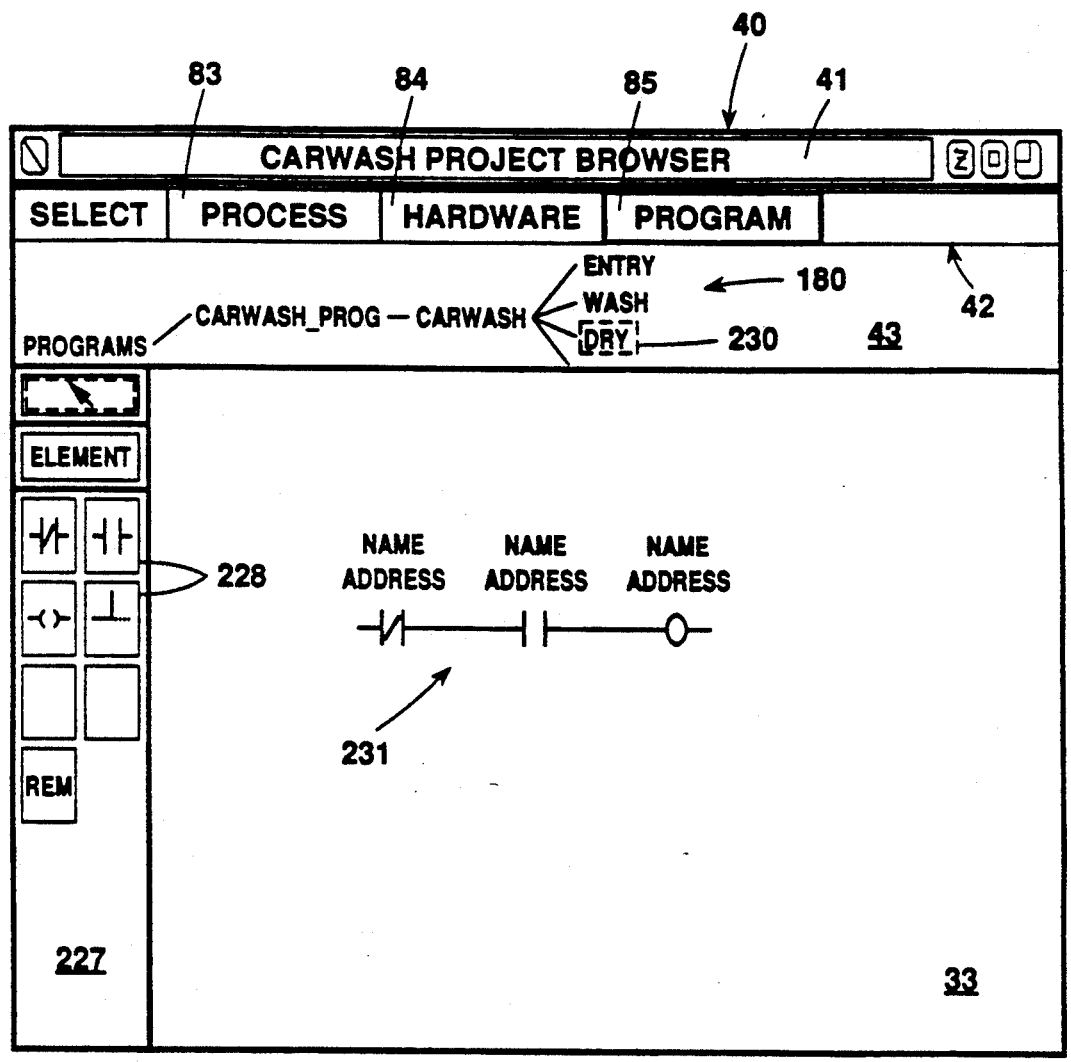

FIG. 43 illustrates a palette panel 227 with tools 228 for graphing a ladder diagram program 231 for the DRY portion of the PROCESS as represented by dashed line box 230. This program would be executed by a controller processor at the EXIT location. The graphical symbols for ladder diagram instructions are the tools 228 or "elements" in the palette panel 227.

3. Compiling the Resulting Graphical Program

As seen in FIG. 34, the "COMPILE" command 229 is selected with mouse 17 from a menu 184 in the editing window for the CARWASH program 175. This causes the program to be compiled into an executable code file 11. The file may be saved to disk or transmitted on the network 12 to the target processor 23. If a ladder diagram program is involved, it can be translated to a ladder instruction file before it is saved to disk or transmitted through the network 12 to the target processor 23.

When compiling the program, reference is made through the variables in the program to the tag names for the hardware inputs and outputs which have been visually connected to the program variables. The compiler then refers to data from the HARDWARE editing task to relate the tag names for the hardware inputs and outputs to system I/O addresses (rack number, module group number, module, I/O bit) assigned during activation of the HARDWARE editing task.

Thus, if a program is reassigned to a different controller processor, or if the I/O modules are moved or reassigned within a particular controller, the graphical program information from the PROGRAM editing task can be reused. The hardware I/O tags are reconfigured to the new system I/O addresses using the HARDWARE editing task. The executable code is then compiled from the previous graphical program.

The menu 184 provides commands including "PROCESSOR" for reassigning a program to a different controller processor. Selection of this command will open another menu (not shown) with a list of controller processors.

This concludes the detailed description of a preferred embodiment of the invention. It will be appreciated by those of ordinary skill in the pertinent technical fields that many details herein have been given by way of example and that various modifications and additions might be made, while still utilizing the concepts of the invention. Therefore, to apprise those who practice in the pertinent technical fields and interested members of the public as to the scope of the invention, reference is made to the following claims.

We claim:

1. A method of operating a programming computer to construct a graphical representation of a controller program in preparation for conversion of the controller program into a form for execution by a specific controller, the method comprising:

in response to a first plurality of user inputs, constructing one or more related views for display on a screen of the programming computer, wherein the one or more related views show a graph of an industrial or commercial process to be controlled by one or more controllers, the graph including visual representations of objects associated with visual representations of input signals and output signals that are to be monitored and controlled by the specific controller;

in response to a second plurality of user inputs, constructing a second group of one or more related views for display of one or more objects representing the controller program on the screen of the programming computer, and for display of visual representations of input and output program variables associated with the objects representing the controller program; and in response to a third plurality of user inputs, visually associating on the screen at the same time the visual representations of the input and output program variables with the visual representations of the input signals and output signals to be monitored and controlled by the specific controller.

2. The method of claim 1, wherein the visually associating step includes:

in response to a fourth plurality of user inputs, visually associating the visual representations of the input signals and output signals to be monitored and controlled with visual representations of the inputs and outputs for controller hardware; and displaying on the screen connections between the visual representations of the input and output program variables and visual representations corresponding to the inputs and outputs for the controller hardware.

3. The method of claim 2, wherein the inputs and outputs for the controller hardware are visually represented by respective system I/O addresses; and further comprising the step of visually associating on the screen of the programming computer the visual representations of the input and output program variables for the controller program with the respective system I/O addresses for the inputs and outputs for the controller hardware.

4. The method of claim 2, wherein the input signals and output signals to be monitored and controlled are visually represented with alphanumeric names; and wherein the visual representations of the input signals and output signals to be monitored and controlled are visually associated with the inputs and outputs for the controller hardware by moving the alphanumeric names to graphic positions for inputs and outputs for the controller hardware.

5. The method of claim 4, wherein the visual representations of the input and output program variables in the controller program are displayed within visual connections to the alphanumeric names for the inputs and outputs for the controller hardware.

6. A method of operating a programming computer to construct a graphical representation of a controller program in preparation for conversion of the controller program into a form for execution by the controller, the method comprising:

activating first, second and third graphical editing tasks for display of objects on a screen of the programming computer, wherein each graphical editing task controls display of objects in an editing window that occupies a portion of the screen;

during activation of the first graphical editing task, in response to a plurality of user inputs, constructing in the editing window a graph of an industrial or commercial process to be controlled by one or more controllers, and visually representing a plurality of input signals and output signals for the industrial or commercial process;

during activation of the second graphical editing task, making one or more user inputs for visually associating the visual representations of the input signals and output signals from the first graphical editing task with a visual representation for a specific controller processor to be programmed to control the industrial or commercial process; and during activation of the third graphical editing task, making one or more user inputs to visually associate the visual representations of the input signals and output signals from the first graphical editing task with visual representations for input and output program variables in a program for the specific controller processor.

7. The method of claim 6, further comprising, in response to further user inputs, the step of connecting visual representations of a group of hardware inputs and outputs associated with the specific controller processor to visual representations for the input and output program variables in the program for the specific controller processor.

8. The method of claim 6, wherein each graphical editing task displays a selection bar that extends laterally across a portion of the screen and has three selection areas corresponding to the three graphical editing tasks, wherein each of the graphical editing tasks is activated by selecting a respective one of the selection areas using a mouse input device.

9. A method of operating a programming computer to construct a graphical representation of a controller program in preparation for conversion of the controller program into a form for execution by a controller, the method comprising:

activating a graphical editing task to direct display of a tree graph window and a graph editing window concurrently on the screen of the programming computer;

wherein the graphical editing task stores in the memory of the programming computer a plurality of graphs for viewing in the graph editing window;

wherein the graphical editing task directs display of a tree graph in the tree graph window with branches of the tree graph showing a hierarchical relationship of the plurality of graphs for viewing in the graph editing window; and operating a user input device on the programming computer to select a particular branch of the tree graph to display a selected graph in the graph editing window on the screen of the programming computer.

10. A method of operating a programming computer to construct a graphical representation of a controller program in preparation for conversion of the controller program into a form for execution by the controller, the method comprising:

activating a graphical editing task that controls the display of objects on a screen of the programming computer, wherein the graphical editing task directs display of an editing window that occupies a portion of the screen; and wherein the graphical editing task directs display of a first palette panel which a plurality of selectable functions of the type for adding objects in the editing window and wherein the graphical editing task directs display of a second palette panel with a plurality of selectable functions of the type for adding inputs and outputs on the objects added with the first palette panel; and with a user input device, making selections on the first and second palette panels to select and direct display of objects with inputs and outputs in the editing window; and wherein the graphical editing task includes and displays as part of the first and second palette panels a pair of oppositely pointing scrolling arrows, and wherein the user input device is operated to select one of the scrolling arrows to display one of the first and second palette panels and hide the other one of the first and second palette panels from display.

11. The method of claim 10, wherein the graphical editing task includes and displays a third palette panel with a plurality of selectable locations for objects selected with the first palette panel; and with a user input device, making selections on the third palette panel to display objects with specific locations in the editing window.

12. The method of claim 10, wherein the graphical editing task includes and displays a third palette panel with a plurality of selectable electrical functions for inputs and outputs selected with the second palette panel; and with a user input device, making selections on the third palette panel to display objects with specific electrical functions in the editing window.

13. A method for use with a computer system of the type having a display screen and a user input device, the method comprising:

in response to a first plurality of user inputs, directing display of a graphical image of an electronic controller chassis on the screen, wherein the graphical image has portions corresponding to respective positions for I/O modules; and in response to a second plurality of user inputs, directing display of a graphical image of an I/O module on the screen and superimposing said graphical image of the I/O module on said graphical image of the electronic controller chassis to simulate positioning of an I/O module in an actual electronic controller chassis.

14. The method of claim 13, wherein the first plurality of user inputs comprises positioning a cursor over a palette of selections to select one of a plurality of electronic controller chassis;

operating one or more buttons on the user input device to select a particular controller chassis for display on the screen;

positioning the cursor over the display of the particular controller chassis; and operating one or more buttons on the input device to display a second image of the electronic controller chassis which includes portions identifying respective positions for I/O modules.

15. The method of claim 13, wherein the second plurality of user inputs comprises:

operating the user input device to open a menu that includes a command to add an I/O module; and operating the user input device to select the command to add an I/O module in the location with the lowest available I/O module address in the electronic controller chassis.

16. The method of claim 13, further comprising the step, in response to further user inputs, of directing display of multiple menus, one menu having options for defining the I/O module as including inputs or outputs, another menu having options for the voltage level of such inputs or outputs, and another menu having options for selecting a specific I/O module according to the options selected from the first and second menus.

17. An object-oriented method of operating a programming computer to construct a graphical representation of a controller program in preparation for conversion of the controller program into a form for execution by the controller, the method comprising:

constructing a plurality of graphs including at least one connected graph characterized by an arc linking a first vertex on a first node with a second vertex on a second node;

adding nodes to form the graphs by selecting and executing groups of object-oriented instructions for a plurality of node models for the respective graphs, wherein the groups of object-oriented instructions for the plurality of node models are related to a common group of object-oriented instructions for a node class;

adding vertices to form the graphs by selecting and executing groups of object-oriented instructions for a plurality of vertex models for the respective graphs, wherein the groups of object-oriented instructions for the plurality of vertex models are related to a common group of object-oriented instructions for a vertex class; and adding arcs to form the connected graph by the selecting and executing groups of object-oriented instructions for an arc class.

18. The method of claim 17, wherein the plurality of graphs includes first and second graphs; and further comprising the step of organizing the first and second graphs in a graph hierarchy by storing the second graph in memory and visually representing the second graph as a node in the first graph.

19. The method of claim 17, wherein the step of constructing a plurality of graphs further comprises the steps of:

selecting and executing a first group of object-oriented instructions for constructing a first graph for a process to be controlled, selecting and executing a second group of object-oriented instructions for constructing a second graph for controller hardware to control the process, and selecting and executing a third group of object-oriented instructions for constructing a third graph for a program for the controller hardware.

* * * * *